(12) United States Patent
Kamalsky et al.

(10) Patent No.: US 10,839,386 B2
(45) Date of Patent: Nov. 17, 2020

(54) STORED VALUE SMART CONTRACTS ON A BLOCKCHAIN

(71) Applicant: eBay Inc., San Jose, CA (US)

(72) Inventors: David John Kamalsky, Campbell, CA (US); Ethan Benjamin Rubinson, Santa Clara, CA (US); Sergio Pinzon Gonzales, Jr., San Jose, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/181,814

(22) Filed: Nov. 6, 2018

(65) Prior Publication Data
US 2019/0205870 A1    Jul. 4, 2019

Related U.S. Application Data

(60) Provisional application No. 62/612,091, filed on Dec. 29, 2017.

(51) Int. Cl.
*G06Q 20/38* (2012.01)
*H04L 29/06* (2006.01)
(Continued)

(52) U.S. Cl.
CPC ....... *G06Q 20/389* (2013.01); *G06F 16/1805* (2019.01); *G06F 16/27* (2019.01);
(Continued)

(58) Field of Classification Search
CPC .. G06F 21/10; G06F 30/04; Y10S 707/99933; Y10S 707/99943;
(Continued)

(56) References Cited

U.S. PATENT DOCUMENTS 5,557,088 A * 9/1996 Shimizu ............... G06Q 20/343
235/383
5,607,350 A * 3/1997 Levasseur ................. G07F 5/24
194/217
(Continued)

FOREIGN PATENT DOCUMENTS

CN         106130738 A      11/2016
CN         106777923 A       5/2017
(Continued)

OTHER PUBLICATIONS

Bhargavan et al. "Short Paper: Formal Verification of Smart Contracts" http://research.microsoft.com/en-us/um/people/nswamy/papers/solidether.pdf Aug. 27, 2016 Retreived From Wayback Machine. pp. 1-6. (Year: 2016).*

(Continued)

*Primary Examiner* — Kelly S Campen
(74) *Attorney, Agent, or Firm* — Shook, Hardy & Bacon, L.L.P.

(57) ABSTRACT

Technologies are shown for managing stored value on a blockchain involving creating a stored value contract block on a blockchain having an identifier of a first entity and code for transferring a portion of a stored value to a designated party. Funds data is stored to the blockchain indicating the stored value committed to the stored value contract block by the first entity. Code is invoked with an identifier of a second entity to transfer a portion of the stored value to the second entity. Some examples involve an intermediary entity verifying conditions defined in the stored value contract block in order to complete transfer. Other examples involve an intermediary entity monitoring conditions in order to initiate transfer when the conditions are satisfied.

15 Claims, 17 Drawing Sheets

(51) Int. Cl.

| | | |
|---|---|---|
| H04L 9/32 | (2006.01) | |
| G06F 21/62 | (2013.01) | |
| G06F 21/10 | (2013.01) | |
| G06Q 20/08 | (2012.01) | |
| G06Q 40/08 | (2012.01) | |
| G06F 16/27 | (2019.01) | |
| G06F 16/18 | (2019.01) | |
| G06F 21/30 | (2013.01) | |
| H04L 9/06 | (2006.01) | |
| G06Q 20/42 | (2012.01) | |
| G06Q 30/00 | (2012.01) | |
| G06F 21/60 | (2013.01) | |
| G06Q 20/40 | (2012.01) | |
| H04L 9/30 | (2006.01) | |
| H04L 29/08 | (2006.01) | |
| G06F 21/64 | (2013.01) | |

(52) U.S. Cl.
CPC .............. *G06F 21/10* (2013.01); *G06F 21/30* (2013.01); *G06F 21/602* (2013.01); *G06F 21/62* (2013.01); *G06F 21/6218* (2013.01); *G06F 21/6245* (2013.01); *G06Q 20/0855* (2013.01); *G06Q 20/3825* (2013.01); *G06Q 20/3829* (2013.01); *G06Q 20/401* (2013.01); *G06Q 20/42* (2013.01); *G06Q 30/018* (2013.01); *G06Q 40/08* (2013.01); *H04L 9/0637* (2013.01); *H04L 9/0643* (2013.01); *H04L 9/30* (2013.01); *H04L 9/3236* (2013.01); *H04L 9/3239* (2013.01); *H04L 9/3247* (2013.01); *H04L 9/3297* (2013.01); *H04L 63/102* (2013.01); *H04L 63/12* (2013.01); *H04L 65/4084* (2013.01); *H04L 67/20* (2013.01); *H04L 67/327* (2013.01); *G06F 21/645* (2013.01); *G06F 2221/2107* (2013.01); *H04L 67/18* (2013.01); *H04L 2209/38* (2013.01); *H04L 2209/56* (2013.01)

(58) Field of Classification Search
CPC .. G06Q 20/389; G06Q 20/382; G06Q 20/401; G06Q 2220/00; H04L 2209/38; H04L 2209/56
USPC .......................................... 705/50, 51, 57, 44
See application file for complete search history.

(56) References Cited

U.S. PATENT DOCUMENTS

| | | | | |
|---|---|---|---|---|
| 7,627,531 | B2 * | 12/2009 | Breck | G06Q 20/206 705/65 |
| 7,656,271 | B2 * | 2/2010 | Ehrman | G07C 5/008 340/5.8 |
| 9,635,000 | B1 | 4/2017 | Muftic | |
| 9,641,342 | B2 | 5/2017 | Sriram et al. | |
| 9,680,799 | B2 | 6/2017 | Iyer et al. | |
| 9,722,790 | B2 | 8/2017 | Ebrahimi | |
| 9,749,140 | B2 | 8/2017 | Oberhauser et al. | |
| 9,749,297 | B2 | 8/2017 | Gvili | |
| 9,774,578 | B1 | 9/2017 | Ateniese et al. | |
| 2004/0024688 | A1 | 2/2004 | Bi et al. | |
| 2006/0100965 | A1 | 5/2006 | Simelius | |
| 2013/0174272 | A1 | 7/2013 | Chevalier et al. | |
| 2013/0219458 | A1 | 8/2013 | Ramanathan | |
| 2015/0302400 | A1 | 10/2015 | Metral | |
| 2015/0332283 | A1 | 11/2015 | Witchey | |
| 2016/0028552 | A1 | 1/2016 | Spanos et al. | |
| 2016/0191243 | A1 | 6/2016 | Manning | |
| 2016/0203572 | A1 | 7/2016 | Mcconaghy et al. | |
| 2016/0284033 | A1 | 9/2016 | Winand et al. | |
| 2016/0300234 | A1 | 10/2016 | Moss-pultz et al. | |
| 2016/0321752 | A1 | 11/2016 | Tabacco et al. | |
| 2016/0330034 | A1 | 11/2016 | Back et al. | |
| 2016/0335533 | A1 | 11/2016 | Davis et al. | |
| 2016/0342976 | A1 | 11/2016 | Davis | |
| 2016/0342977 | A1 | 11/2016 | Lam | |
| 2016/0358184 | A1 * | 12/2016 | Radocchia | H04W 4/70 |
| 2016/0379212 | A1 | 12/2016 | Bowman et al. | |
| 2017/0005804 | A1 | 1/2017 | Zinder | |
| 2017/0011460 | A1 | 1/2017 | Molinari et al. | |
| 2017/0046526 | A1 | 2/2017 | Chan et al. | |
| 2017/0046651 | A1 | 2/2017 | Lin et al. | |
| 2017/0046664 | A1 | 2/2017 | Haldenby et al. | |
| 2017/0048209 | A1 | 2/2017 | Lohe et al. | |
| 2017/0103390 | A1 | 4/2017 | Wilson et al. | |
| 2017/0109735 | A1 | 4/2017 | Sheng et al. | |
| 2017/0116693 | A1 | 4/2017 | Rae et al. | |
| 2017/0132630 | A1 | 5/2017 | Castinado et al. | |
| 2017/0149560 | A1 | 5/2017 | Shah | |
| 2017/0177898 | A1 | 6/2017 | Dillenberger | |
| 2017/0232300 | A1 | 8/2017 | Tran et al. | |
| 2017/0236102 | A1 * | 8/2017 | Biton | G06Q 20/065 705/64 |
| 2017/0236103 | A1 * | 8/2017 | Biton | G06Q 20/065 705/64 |
| 2017/0236104 | A1 * | 8/2017 | Biton | G06Q 20/065 705/64 |
| 2017/0237570 | A1 | 8/2017 | Vandervort | |
| 2017/0243193 | A1 | 8/2017 | Manian et al. | |
| 2017/0250796 | A1 | 8/2017 | Samid | |
| 2017/0300627 | A1 | 10/2017 | Giordano et al. | |
| 2017/0300928 | A1 * | 10/2017 | Radocchia | H04W 12/02 |
| 2017/0302663 | A1 | 10/2017 | Nainar et al. | |
| 2017/0308872 | A1 | 10/2017 | Uhr et al. | |
| 2017/0317997 | A1 | 11/2017 | Smith et al. | |
| 2017/0329980 | A1 | 11/2017 | Hu et al. | |
| 2017/0331810 | A1 | 11/2017 | Kurian | |
| 2017/0337534 | A1 | 11/2017 | Goeringer et al. | |
| 2017/0366353 | A1 | 12/2017 | Struttmann | |
| 2018/0018723 | A1 | 1/2018 | Nagla et al. | |
| 2018/0025442 | A1 | 1/2018 | Isaacson et al. | |
| 2018/0173719 | A1 | 6/2018 | Bastide et al. | |
| 2018/0257306 | A1 | 9/2018 | Mattingly et al. | |
| 2018/0294957 | A1 | 10/2018 | O'brien et al. | |
| 2018/0330348 | A1 * | 11/2018 | Uhr | G06Q 20/145 |
| 2018/0330349 | A1 * | 11/2018 | Uhr | G06Q 20/14 |
| 2018/0349621 | A1 | 12/2018 | Schvey et al. | |
| 2018/0349893 | A1 | 12/2018 | Tsai | |
| 2019/0102409 | A1 | 4/2019 | Shi et al. | |
| 2019/0109713 | A1 | 4/2019 | Clark et al. | |
| 2019/0205558 | A1 | 7/2019 | Gonzales, Jr. | |
| 2019/0205563 | A1 | 7/2019 | Gonzales, Jr. | |
| 2019/0205873 | A1 | 7/2019 | Kamalsky et al. | |
| 2019/0205894 | A1 | 7/2019 | Gonzales, Jr. et al. | |
| 2019/0207759 | A1 | 7/2019 | Chan et al. | |
| 2019/0207995 | A1 | 7/2019 | Gonzales, Jr. | |
| 2020/0012763 | A1 | 1/2020 | Arngren et al. | |
| 2020/0119905 | A1 * | 4/2020 | Revankar | H04L 9/3239 |
| 2020/0195436 | A1 * | 6/2020 | Khan | H04L 9/0637 |

FOREIGN PATENT DOCUMENTS

| | | | |
|---|---|---|---|
| CN | 106920169 A | | 7/2017 |
| CN | 107070644 A | | 8/2017 |
| CN | 107077682 A | | 8/2017 |
| CN | 107086909 A | | 8/2017 |
| CN | 107273759 A | * | 10/2017 |
| KR | 10-1781583 B1 | | 9/2017 |
| WO | 2016/128567 A1 | | 8/2016 |
| WO | 2017/004527 A1 | | 1/2017 |
| WO | 2017/006136 A1 | | 1/2017 |
| WO | 2017/066002 A1 | | 4/2017 |
| WO | 2017/090041 A1 | | 6/2017 |
| WO | 2017/098519 A1 | | 6/2017 |
| WO | 2017/145003 A1 | | 8/2017 |
| WO | 2017/145017 A1 | | 8/2017 |
| WO | 2017/145047 A1 | | 8/2017 |
| WO | 2017/148245 A1 | | 9/2017 |
| WO | 2017/163069 A1 | | 9/2017 |
| WO | 2017/163220 A1 | | 9/2017 |

(56) References Cited

FOREIGN PATENT DOCUMENTS

| WO | WO 2017153495 A1 * | 9/2017 |
|---|---|---|
| WO | 2017/178956 A1 | 10/2017 |
| WO | 2017/182601 A1 | 10/2017 |
| WO | 2017/195160 A1 | 11/2017 |
| WO | 2017/196701 A1 | 11/2017 |
| WO | 2019/133307 A1 | 7/2019 |
| WO | 2019/133308 A1 | 7/2019 |
| WO | 2019/133309 A1 | 7/2019 |
| WO | 2019/133310 A1 | 7/2019 |

OTHER PUBLICATIONS

Huckle, Steve; Bhattacharya, Rituparna; White, Martin; Beloff, Natalia (2016). "Internet of Things, Blockchain and Shared Economy Applications". Procedia Computer Science. Elsevier B.V. 98: 463. (Year: 2016).*
"A Tech Startup Wants to Use Blockchain to Make Event Tickets Fraud-Proof", Retrieved from the Internet URL: <https://www.forbes.com/sites/forbestreptalks/2017/06/15/a-tech-startup-upgraded-wants-to-use-blockchain-to-make-event-tickets-fraud-proof-and-to-sell-more-stuff-to-fans/#41659e3a7ffa>, Jun. 15, 2017, 5 pages.
"Blockchain in Ticketing. Why Do Ticketing Companies Need It?—Softjourn", Retrieved from the Internet URL: <https://softjourn.com/blockchain-in-ticketing>, Accessed on Sep. 11, 2018, 7 pages.
"Blockchain Secure Event Ticketing for Music, Festivals and Meetups", Retrieved from the Internet URL: <https://eventchain.io/>, Accessed on Sep. 11, 2018, 9 pages.
"Blockchain Startups Take on Ticket Touting, But Will They Gain Traction?", Retrieved from the Internet URL: <https://www.coindesk.com/blockchain-startups-take-ticket-touting-will-gain-traction/>, Jul. 31, 2017, 5 pages.
"Blocktix—An Ethereum Event Hosting Platform Designed for the Real World", Retrieved from the Internet URL: <https://blog.blocktix.io/blocktix-an-ethereum-event-hosting-platform-designed-for-the-real-world-d52f8a838ecc>, Jan. 25, 2017, 3 pages.
"Cloudchain—Ticketing Platform Based on Blockchain—Reply", Retrieved from the Internet URL: <http://www.reply.com/en/content/blockchain-ticketing-solution-cloudchain>, Accessed on Sep. 11, 2018, 3 pages.
"Crypto.tickets", Retrieved from the Internet URL: <https://blog.crypto.tickets/>, Accessed on Sep. 11, 2018, 2 pages.
"Ethereum Wallets are Enabling Transaction Scheduling, Killer Feature", Ethereum News, Retrieved from the Internet URL: <https://www.ccn.com/ethereum-wallets-are-enabling-transaction-scheduling-killer-feature/>, Sep. 18, 2018, 6 pages.
"GUTS Tickets—Honest ticketing", Retrieved from the Internet URL: <https://guts.tickets/>, Accessed on Sep. 11, 2018, 9 pages.
"How Can a Contract Run Itself at a Later Time?", Retrieved from the Internet URL:<https://ethereum.stackexchange.com/questions/42/how-can-a-contract-run-itself-at-a-later-time>, Accessed date on Sep. 24, 2018, 12 pages.
"The Alarm Service Is Now Available on the Testnet", Retrieved from the Internet URL: <http://blog.ethereum-alarm-clock.com/blog/2016/1/16/the-alarm-service-is-now-available-on-the-testnet>, Jan. 16, 2016, 2 pages.
"The Aventus Protocol: Blockchain for Ticketing", Retrieved from the Internet URL: <https://aventus.io/>, Accessed on Sep. 11, 2018, 9 pages.
"Upgraded Tickets", Retrieved from the Internet URL: <https://www.upgraded-inc.com/>, Accessed on Sep. 11, 2018, 14 pages.
Biddeer Coin, "Bidder Coin White Paper", Dec. 28, 2017, 36 pages.
Chainfrog, "What Are Smart Contracts?", Retrieved from the Internet URL: <http://www.chainfrog.com/wp-content/uploads/2017/08/smart-contracts.pdf>, 2017, 13 pages.
Chen, et al., "Under-Optimized Smart Contracts Devour Your Money", Retrieved from the Internet URL: <https://arxiv.org/pdf/1703.03994.pdf >, Mar. 11, 2016, 5 pages.
Gollapudi, "White Paper—A Next-Generation Smart Contract and Decentralized Application Platform", Retrieved from the Internet URL: < https://github.com/ethereum/wiki/wiki/White-Paperf18902f4e7fb21dc92b37e8a0963eec4b3f4793a >, May 29, 2017, pp. 1-23.
Kehrli, "Blockchain Explained", Retrieved from the Internet URL: <https://www.niceideas.ch/blockchain_explained.pdf>, Oct. 7, 2016, pp. 1-25.
Szabo, "Smart Contracts: Building Blocks for Digital Markets", Retrieved online from the Internet URL: <http://www.alamut.com/subj/economics/nick_szabo/smartContracts.html>, 1996, pp. 1-17.
Triantafyllidis, "Developing an Ethereum Blockchain Application", Retrieved from the Internet URL: <http://www.delaat.net/rp/2015-2016/p53/report.pdf >, Feb. 19, 2016, 59 pages.
Bidder Coin, "Bidder Coin White Paper", Dec. 28, 2017, 36 pages.
Ramachandran, "Using Blockchain and Smart Contracts for Secure Data Provenance Management," Sep. 28, 2017, pp. 1-11.
Chronologic, "Temporal Innovation on the Blockchain", Retrieved from the Internet URL: <https://chronologic.network/uploads/Chronologic_Whitepaper.pdf> , Oct. 11, 2018, 25 pages.
Non-Final Office Action Received for U.S. Appl. No. 15/858,949, dated Aug. 30, 2019, 10 pages.
Notice of Allowance received for U.S. Appl. No. 15/858,949, dated Feb. 3, 2020, 6 pages.
Response to Non-Final Office Action filed on Nov. 21, 2019, for U.S. Appl. No. 15/858,949, dated Aug. 30, 2019, 14 pages.
Non-Final Office Action received for U.S. Appl. No. 16/020,975, dated Feb. 28, 2020, 12 pages.
Restriction Requirement Received for U.S. Appl. No. 16/041,671, dated Mar. 30, 2020, 7 pages.
Non Final Office Action Received for U.S. Appl. No. 16/041,680, dated Feb. 26, 2020, 10 pages.
Kishigami, et al., "The Blockchain-Based Digital Content Distribution System", 2015 IEEE Fifth International Conference on Big Data and Cloud Computing, Aug. 1, 2015, pp. 187-190.
International Search Report received for PCT Application No. PCT/US2018/065852, dated Feb. 19, 2019, 4 pages.
International Written Opinion received for PCT Application No. PCT/US2018/065852, dated Feb. 19, 2019, 6 pages.
International Search Report received for PCT Application No. PCT/US2018/065854, dated Feb. 21, 2019, 3 pages.
Written Opinion received for PCT Patent Application No. PCT/US2018/065854, dated Feb. 21, 2019, 6 pages.
International Search Report received for PCT Application No. PCT/US2018/065860, dated Feb. 19, 2019, 3 pages.
International Written Opinion received for PCT Application No. PCT/US2018/065860, dated Feb. 19, 2019, 6 pages.
Steichen, et al., "Blockchain-Based, Decentralized Access Control for IPFS", Retrieved from the Internet URL: <https://www.researchgate.net/publication/327034734>, Jul. 2018, 9 pages.
White Paper, "White Paper: PGP Key Management Server from Symantec", An Introduction to PGP Key Management Server from Symantec, 2010, 17 pages.
Zhang, "Orthogonality Between Key Privacy and Data Privacy", ResearchGate, Revisited, Conference Paper, Aug. 2007, 17 pages.
Ateniese et al., "Redactable Blockchain- or -Rewriting History in Bitcoin and Friends", IEEE European Symposium on Security and Privacy, May 11, 2017, 38 pages.
International Search Report received for PCT Application No. PCT/US2018/065851, dated Feb. 18, 2019, 4 pages.
International Written Opinion received for PCT Application No. PCT/US2018/065851, dated Feb. 18, 2019, 6 pages.
Response to Requirement for Restriction/Election filed on Apr. 17, 2020, for U.S. Appl. No. 16/041,671, dated Mar. 30, 2020, 15 pages.
Corrected Notice of Allowability received for U.S. Appl. No. 15/858,949, dated Jun. 10, 2020, 2 pages.
Notice of Allowance received for U.S. Appl. No. 16/020,969, dated May 18, 2020, 16 pages.
Applicant Initiated Interview Summary Received for U.S. Appl. No. 16/020,975, dated Jun. 2, 2020, 2 pages.
Response to Non-Final Office Action filed on May 22, 2020 for U.S. Appl. No. 16/020,975, dated Feb. 28, 2020, 15 pages.
Notice of Non Compliant Amendment received for U.S. Appl. No. 16/041,671, dated Apr. 23, 2020, 2 pages.

(56) References Cited

OTHER PUBLICATIONS

Response to Notice of Non-Compliant Amendment filed on Jun. 22, 2020, for U.S. Appl. No. 16/041,671, dated Apr. 23, 2020, 14 pages.
Applicant Initiated Interview Summary Received for U.S. Appl. No. 16/041,680, dated May 1, 2020, 3 Pages.
Notice of Allowance received for U.S. Appl. No. 16/041,680, dated Jun. 10, 2020, dated Jun. 10, 2020, 8 pages.
Response to Non-Final Office Action filed on May 18, 2020 for U.S. Appl. No. 16/041,680, dated Feb. 26, 2020, 16 pages.

* cited by examiner

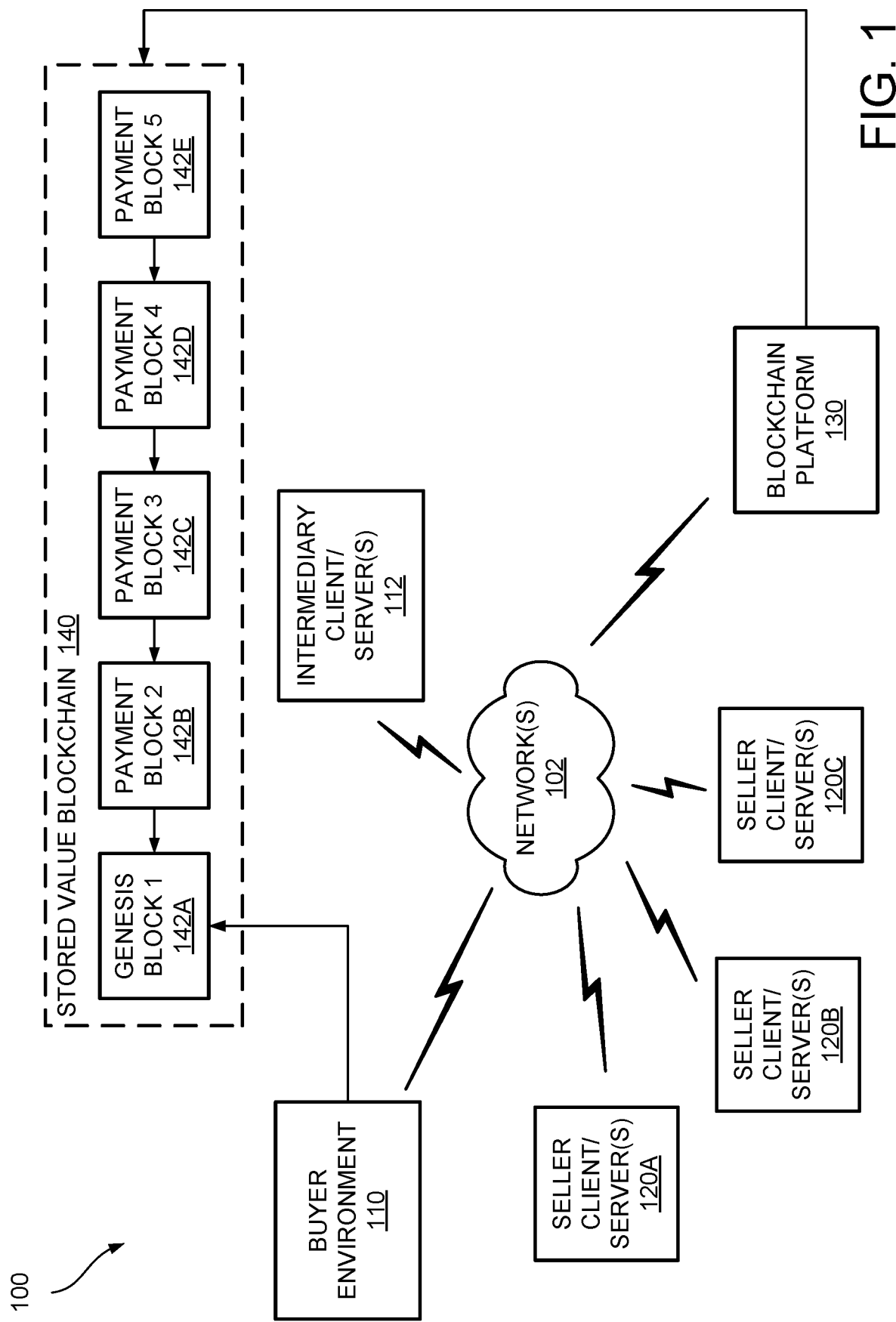

242

BUYER ENVIRONMENT CREATES STORED VALUE BLOCK ON BLOCKCHAIN WITH BUYER AS OWNER, PAYMENT REQUIRED INITIALLY SET TO FALSE, AND CONDITIONS DEFINED
320

STORED VALUE BLOCK STATE 322 owner(buyer_ID1)
amount (stored_value1)
payment_req(FALSE)
conds(A, B, C)

STORED VALUE CONTRACT BLOCK 324

METHODS

Payment(String paymentID, paymentAmount, seller) /* Called by seller */
{
    if(paymentID.required == true && caller == seller)
    validateTransfer();
        payment[id].transferee=seller
}

Complete(paymentID, paymentAmount, buyer) /* Called by buyer to a third party verification environment */
{
if (caller == buyer && seller == payment[id].transferee)
    payment[id].required=true
}

FIG. 3B

STORED VALUE SMART CONTRACTS ON A BLOCKCHAIN

CROSS REFERENCE TO RELATED APPLICATIONS

This application claims the benefit of U.S. Provisional Patent Appl. No. 62/612,091 for "Enhanced Distributed Database and Data Communications Operations" filed Dec. 29, 2017, herein incorporated by reference in its entirety for all purposes.

BACKGROUND

Traditional transactions, such as installment plans or bonds, often require periodic or scheduled payments in accordance with the transaction conditions, which typically set forth the amount and timing of payments from a buyer or debtor to a seller or creditor. These transactions normally rely on the good faith and financial stability of the buyer or debtor. The possibility of a default, e.g. a failure to pay by the buyer or debtor, can result in terms that require an overall higher amount to be paid by to the seller or creditor in order to compensate for the risk of default. Also, these transactions normally require that the seller or creditor be known and identified within a contract for a transaction.

Current e-commerce or e-tailing platforms generally do not provide effective and readily usable approaches for executing contracts based on the conditions of the contracts in a manner that allows for safe and traceable scheduled payments between parties. Further, the contracts themselves and the manner in which the contracts and transaction under the contracts are often not transparent to parties to the contracts or to other parties that may have an interest in a history of transactions under a contract or the manner in which a contract is manage.

It is with respect to these and other considerations that the disclosure made herein is presented.

SUMMARY

The disclosed technology is directed toward managing stored value on a secure blockchain, e.g. the ETHERIUM blockchain, that provides a traceable, recallable, and non-volatile system for managing stored value and stored value smart contract code on a secure blockchain. Smart contracts are programs with code that can be executed on a blockchain platform and allow logic to be introduced on top of a transaction.

Technologies are disclosed herein for managing stored value on a blockchain, where a stored value block owned by a first party is generated on the blockchain and the first party is set as a holder of the stored value block. The stored value block includes code that, when invoked, operates to make payment from the first party to a second party in accordance with conditions specified in the stored value smart contract. The stored value, stored value smart contract code, and transaction history can be securely and transparently stored on a blockchain.

In certain simplified examples of the disclosed technologies, a method, system or computer readable medium for managing stored value on a blockchain involves creating a stored value contract block on a blockchain that includes an identifier for a first entity, such as a buyer entity, and includes code for transferring at least a portion of a stored value to a designated party. To create the stored value on the stored value blockchain, funds data is stored to the blockchain, where the funds data indicates the stored value that is committed to the stored value contract block by the first entity. To transfer value from the stored value, the code for transferring at least a portion of the stored value to a designated party is invoked with an identifier of a second entity, such as a seller entity, to transfer a portion of the stored value to the second entity.

In some examples where a transfer requires only the buyer's signature on a payment block, the code for transferring at least a portion of the stored value to a designated party involves creating a stored value payment block on the blockchain for the portion of the stored value that identifies the second entity to receive the portion of the stored value and requires a signature of the first entity to release the portion of the stored value, linking the stored value payment block to the stored value block on the blockchain, and signing the stored value payment block to release the portion of the stored value.

In other examples where a transfer requires verification by an intermediate entity, such as an e-commerce platform, the code for transferring at least a portion of the stored value to a designated party in the stored value contract block includes prompting an intermediary entity to verify the transfer, creating a stored value payment block on the blockchain for the portion of the stored value that identifies the designated party to receive the portion of the stored value and requires a signature of the intermediary entity to release the portion of the stored value, and linking the stored value payment block to the stored value block on the blockchain.

Some examples can require the signatures of both the buyer entity and the intermediary entity on a payment block, which allows for both buyer entity control over transfers and intermediary verification of the transfers. In other examples, where the intermediate entity verifies compliance with conditions defined in the stored value contract block, the stored value contract block includes one or more terms or conditions for transfer of portion of the stored value and, responsive to the prompting to verify the transfer, the intermediary entity verifies the one or more terms or conditions are satisfied and, if the one or more terms or conditions are satisfied, signs the stored value payment block to release the portion of the stored value.

In other examples, where an intermediary monitors to detect whether conditions have been met, the stored value contract block includes one or more terms or condition for transfer of a portion of the stored value and the code for transferring at least a portion of the stored value to a designated party in the stored value contract block involves creating a stored value payment block on the blockchain for the portion of the stored value that identifies the designated party to receive the portion of the stored value and requires a signature of the intermediary entity to release the portion of the stored value, and linking the stored value payment block to the stored value block on the blockchain, The intermediary entity monitors the one or more terms or conditions to detect that the one or more terms or conditions are satisfied and, if the terms or conditions are satisfied, the intermediary entity signs the payment block to release the portion of the stored value.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items.

FIG. 1 is an architectural diagram showing an illustrative example of a system for managing stored value on a blockchain;

FIG. 3B is a data architecture diagram showing an illustrative example of a stored value block on a stored value blockchain that includes code for methods for controlling transfer of stored value maintained on the stored value blockchain;

DETAILED DESCRIPTION

Figure 2A:
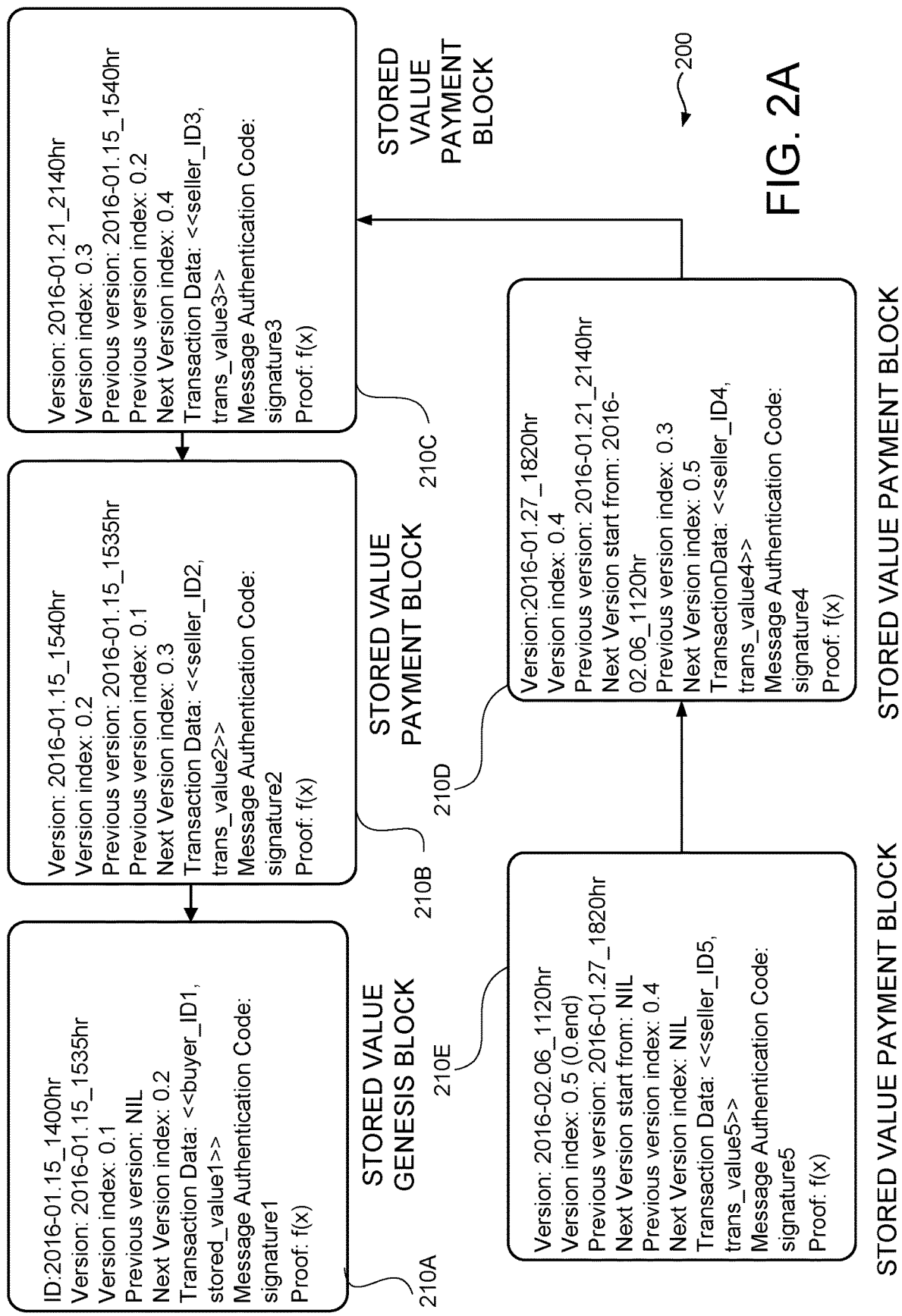
FIG. 2A is a data architecture diagram showing an illustrative example of a stored value blockchain securing stored value in stored value blocks on the blockchain.

Conventional contracts are often fraught with delinquencies and defaults between a seller and buyer. In the context of e-commerce or e-tailing, it is sometimes advantageous to avoid such issues by storing a selected value on a smart contract that is accessed by the seller according to the conditions of the installment plan as memorialized in and controlled by the smart contract. The stored value of the smart contract can be deployed in other contexts outside of defined installment payment plans including but not limited to insurance plans/contracts (e.g., subscriptions, surety contracts, indemnity contracts, self-funded health plans, life insurance, etc.), guarantee contracts, deposits, and bail bonds. As between the transacting parties, various incentives and rewards can be offered to use stored value smart contracts including but not limited to price discounts, shipping/handling discounts, and product/service upgrades.

Specific techniques described herein with regard to stored value smart contracts include: 1) techniques for a blockchain smart contract having stored value for various uses including product/service purchase, insurance, deposits, guaranty contracts, surety, bail bonds and other bonding, 2) techniques for the use of incentives, rewards, and/or favorable transaction terms to incent the use of stored value smart contracts, 3) techniques for mitigating one or more risks associated with installment payment plans (deposits, guaranty, bonds, etc.) using stored value smart contracts, and 4) techniques for use of a third party to validate payment from a stored value smart contract.

The creditee (e.g., buyer) of a transaction (e.g., installment plan, bond issuer, deposit issuer, etc.) creates a blockchain stored value smart contract representing a required payment that is required according to a selected payment plan having various conditions for the amount and timing of payment between the creditee and creditor (e.g., seller). Payments are operatively made and tracked from the creditee to the creditor in the stored value smart contract on the blockchain according to the set conditions of the payment plan established between the creditee and creditor as defined in the smart contract. In some examples, the creditee and creditor can utilize a third party to verify the continuing timing and amount of any required payments. The disclosed technology supports safe and traceable payments between a creditee and creditor according to a defined payment plan using stored value smart contracts on a blockchain, e.g. the ETHERIUM blockchain.

The disclosed technology utilizes a blockchain smart contract that can include therein selected restrictions for the transfer of stored value stored on a stored value blockchain. With the use of blockchain smart contracts having transfer restrictions, such as conditions defining a transferee, an amount, timing, entities with control over transfers, and entities that can initiate transfers, entities can efficiently and effectively control stored value on a blockchain leading to the benefit of buyers, sellers, or intermediaries.

The following Detailed Description describes technologies for a buyer entity to commit funds to establish stored value on a stored value blockchain along with code and conditions governing transfers from the stored value. The disclosed technology utilizing blockchain technology can provide a high level of security and traceability for the stored value, the code controlling transfers, and conditions for transfers.

In addition, the disclosed technology utilizing blockchain technology can provide a high level of flexibility in defining code and conditions for the transfer. For example, the code and conditions can be configured to provide and support a wide variety of contracts, such as an installment payment contract, a subscription contract, an insurance contract, an indemnity contract, a guarantee contract, a deposit contract, a bail bond contract, an incentive contract, and a pre-paid goods or services contract. The ability to manage stored value in smart contracts in accordance with the disclosed technology may lead more favorable conditions for contracts than may be offered utilizing conventional contracts.

A stored value blockchain can be established by a buyer entity or by an intermediary entity in concert with a buyer entity. The stored value blockchain can be generated on a private blockchain or the stored value blocks can be generated and linked to an existing blockchain, such as the ETHERIUM blockchain.

The buyer entity can generate a stored value block that includes the stored value and methods for controlling transfers from the stored value as well as, in some examples, conditions for the transfers. Alternatively, an intermediary entity can generate a stored value block with methods and conditions for controlling transfers for a buyer entity to which the buyer entity commits funds to establish stored value on the stored value blockchain.

One technical advantage of the disclosed technology is that all or parts of the entity identifying data and data tracing transfers as well as the code and conditions for transfers can be encrypted so that they can only be accessed through the methods of the block. For example, the data and code in the stored value blockchain can be encrypted using a public-private key pair, where a public key for an entity, such as a buyer entity or an intermediary entity, is used to encrypt data and a corresponding private key is used to decrypt data. Thus, identifying data, transfer history, code, conditions can be selectively exposed for transparency purposes or protected for security purposes using the disclosed technology.

Another technical advantage of the disclosed stored value management technology includes securely maintaining the stored value, transaction history, and code on a blockchain that can be widely accessed through the internet. Thus, the stored value information, transaction, and code can be securely distributed. Still another technical advantage of the disclosed stored value technology is the distributed nature of the blockchain, which prevents an unauthorized entity from modifying or corrupting the stored value and code at any single point.

Other technical effects other than those mentioned herein can also be realized from implementation of the technologies disclosed herein.

As will be described in more detail herein, it can be appreciated that implementations of the techniques and technologies described herein may include the use of solid state circuits, digital logic circuits, computer components, and/or software executing on one or more input devices. Signals described herein may include analog and/or digital signals for communicating a changed state of the data file or other information pertaining to the data file.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including multiprocessor systems, mainframe computers, microprocessor-based or programmable consumer electronics, minicomputers, hand-held devices, and the like.

By the use of the technologies described herein, a blockchain is used for managing stored value on the blockchain. In a stored value blockchain, stored value blocks securely store value as well as data for transfers from the stored value in a manner that provides wide access so that the data can be readily accessed by users with network access to the blockchain. The stored value blocks can also store definitions for one or more or conditions required for transfers that are defined by a buyer entity who commits funds for the stored value or an intermediary entity to provide effective and flexible control over transfers from the stored value. For increased transparency, code for controlling transfers from the stored value can be included and secured in the stored value blocks.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for a stored value blockchain ledger will be described. As will be described in more detail below with respect to the figures, there are a number of applications and services that may embody the functionality and techniques described herein.

FIG. 1 is an architectural diagram showing an illustrative example of a stored value management distribution system 100 utilizing a stored value blockchain 140. A stored value blockchain can be utilized to securely maintain stored value and control transfers from the stored value. In the embodiment of FIG. 1, blockchain 140 can be a publicly available blockchain that supports scripting, such the ETHEREUM blockchain, which supports a SOLIDIFY scripting language, or BITCOIN, which supports a scripting language called SCRIPT.

In this example, a buyer environment 110, such as a client device, one or more servers, or remote computing resources, is controlled by a buyer entity that commits a stored value to stored value blockchain 140. In one example, buyer environment 110 initiates stored value blockchain 140 by creating genesis data block 142A. For a stored value blockchain, genesis data block 142A, in this example, includes an identifier for a buyer, e.g. the user of buyer environment 110, the value stored in the stored value blockchain 140, and the conditions for payments from the stored value. In other examples, the buyer environment 110 creates a stored value data block that is linked to an existing blockchain, such as the ETHERIUM blockchain.

In some embodiments, the buyer environment 110 can be replaced by another computing node, such as a computer on a peer-to-peer network, or other computing device.

In the example of FIG. 1, the user of buyer environment 110 provides the stored value funds secured on stored value blockchain 140. Payments from the stored value on blockchain 140 can be made to seller or provider entities, such as sellers or providers supported by client/servers 120A, 120B or 120C. In this example, the client/servers 120 can communicate with buyer environment 110, intermediary server 112, such as an e-commerce platform, as well as a network of servers for blockchain platform 130 that supports and maintains blockchain 140. For example, the ETHERIUM blockchain platform from the ETHERIUM FOUNDATION of Switzerland provides a decentralized, distributed computing platform and operating system that provides scripting functionality.

In one example, buyer environment 110 owns the payment blocks 142B-E in stored value blockchain 140. Each payment block 142B-E transfers a portion of the stored value to a seller under the conditions of the blocks 142. The payment blocks 142B-E identify a recipient of the transfer and an amount of the transfer and generally require a signature from buyer environment 110 to release funds committed to the blockchain 140. In another example, a signature from intermediary server 112, e.g. an e-commerce platform, is required to release funds committed to the blockchain 140. In still another example, signatures from both buyer environment and intermediary server 112 are required to release funds committed to the blockchain 140.

In one example, buyer environment controls the blocks 142 on stored value blockchain 140. A payment transaction block that pays funds to a seller entity can require a signature from the buyer environment 110 so that the buyer entity maintains control over release of funds committed to the stored value blockchain 140.

In another example, intermediary server 112 can control the blocks 142 on stored value blockchain 140. A payment transaction block that pays funds to a seller entity can require a signature from the intermediary server 112. The intermediary server 112 maintains control over release of funds committed to the transaction data blockchain 140.

In still another example, a payment transaction block that pays funds to a seller entity can require a signature from the intermediary server 112 and the buyer entity of buyer environment 110 so that the buyer can retain control over release of funds.

By securing commitment of stored value funds for the transaction on the blockchain, this approach ensures that the funds for a series of transactions are committed so that the payments are assured to be completed. By providing a mechanism that assures a stored value is committed by the buyer for payments to a seller entity upon signature of the intermediary and/or the buyer entity, this approach can result in lower transaction costs due to low risk of default. This approach can also provide for incentives to be offered to a buyer, such as a discount for the stored value amount based on present value of the future payments or reduced payment amounts. By providing access to the stored value blockchain 140, this approach can provide full or partial transparency to payments maintained on the blockchain.

FIG. 2A is a data architecture diagram illustrating a simplified example of a stored value blockchain ledger 200 based on the blocks 142A-E of the stored value blockchain ledger 140 of FIG. 1. The stored value blockchain ledger 200 example of FIG. 2A is simplified to show block headers, metadata and signatures of blocks 210A-E in order to demonstrate storage of stored value and payments from the stored value using a blockchain. In outline, a blockchain ledger may be a globally shared transactional database. Signatures can, in some examples, involve all or part of the data stored in the data the blocks 142A-E and can also involve public key addresses corresponding to entities involved in a payment transaction, e.g. a buyer entity, a seller entity, or an intermediary entity.

The blockchain ledger 200 may be arranged as a Merkle tree data structure, as a linked list, or as any similar data structure that allows for cryptographic integrity. The blockchain ledger 200 allows for verification that the transaction data has not been corrupted or tampered with because any attempt to tamper will change a Message Authentication Code (or has) of a block, and other blocks pointing to that block will be out of correspondence. In one embodiment of FIG. 2A, each block may point to another block. Each block may include a pointer to the other block, and a hash (or Message Authentication Code function) of the other block.

Each block in the blockchain ledger may optionally contain a proof data field. The proof data field may indicate a reward that is due. The proof may be a proof of work, a proof of stake, a proof of research, or any other data field indicating a reward is due. For example, a proof of work may indicate that computational work was performed. As another example, a proof of stake may indicate that an amount of cryptocurrency has been held for a certain amount of time. For example, if 10 units of cryptocurrency have been held for 10 days, a proof of stake may indicate 10*10=100 time units have accrued. A proof of research may indicate that research has been performed. In one example, a proof of research may indicate that a certain amount of computational work has been performed—such as exploring whether molecules interact a certain way during a computational search for an efficacious drug compound.

The blocks 210 of stored value blockchain 200 in the example of FIG. 2A shows securing a stored value in a genesis stored value block on the blockchain. In one example, buyer environment 110 of FIG. 1 creates genesis stored value block identifying the buyer as the owner with stored_value1 along with conditions for payment from the stored_value1 secured on the blockchain. The buyer environment 110 commits stored_value1 and signs the genesis block 210A and the blockchain system within which blockchain 200 is created verifies the genesis data block based on a proof function.

Note that a variety of approaches may be utilized that remain consistent with the disclosed technology. In some examples relating to payments, the user of buyer environment 110 is a required entity or the only entity permitted to verify or validate payment blocks 142 on the blockchain. In other examples, an intermediary entity, such as an e-commerce platform, can verify or validate payment blocks.

In the example of FIG. 2A, transaction data, such as a public key or other identifier for a seller, is stored in the stored value blocks 142. In the example of FIG. 2A, buyer environment 110 creates stored value genesis block 210A, which is owned by the buyer and stores a value committed to the blockchain by the buyer, e.g. stored_value1, along with data and code defining conditions for payment. In this example, buyer environment 110 creates stored value payment block 210B to transfer a portion of stored_value1 e.g. trans_value2, to a seller, e.g. seller_ID2, and links block 210B to block 210A. The buyer environment 110 signs stored value payment block 210B and commits block 210B to blockchain 200 for verification by the blockchain platform. Similarly, subsequent payment transactions result in additional stored value payment blocks 210C-E being created and linked to stored value blockchain 200.

Note that in some examples, intermediary server 112 can create the stored value blocks 210. For example, intermediary server 112 creates stored value payment block 210B based on term and conditions defined in stored value genesis block 210A. One possible scenario is a defined payment to a specified entity on a defined schedule, e.g. pay seller_ID2 $100 on the first of each month. Intermediate server 112 monitors the date and transfers $100 from the stored value committed by buyer_ID1 to the stored value blockchain 200 when it detects that the date is the first of the month.

Figure 2B:
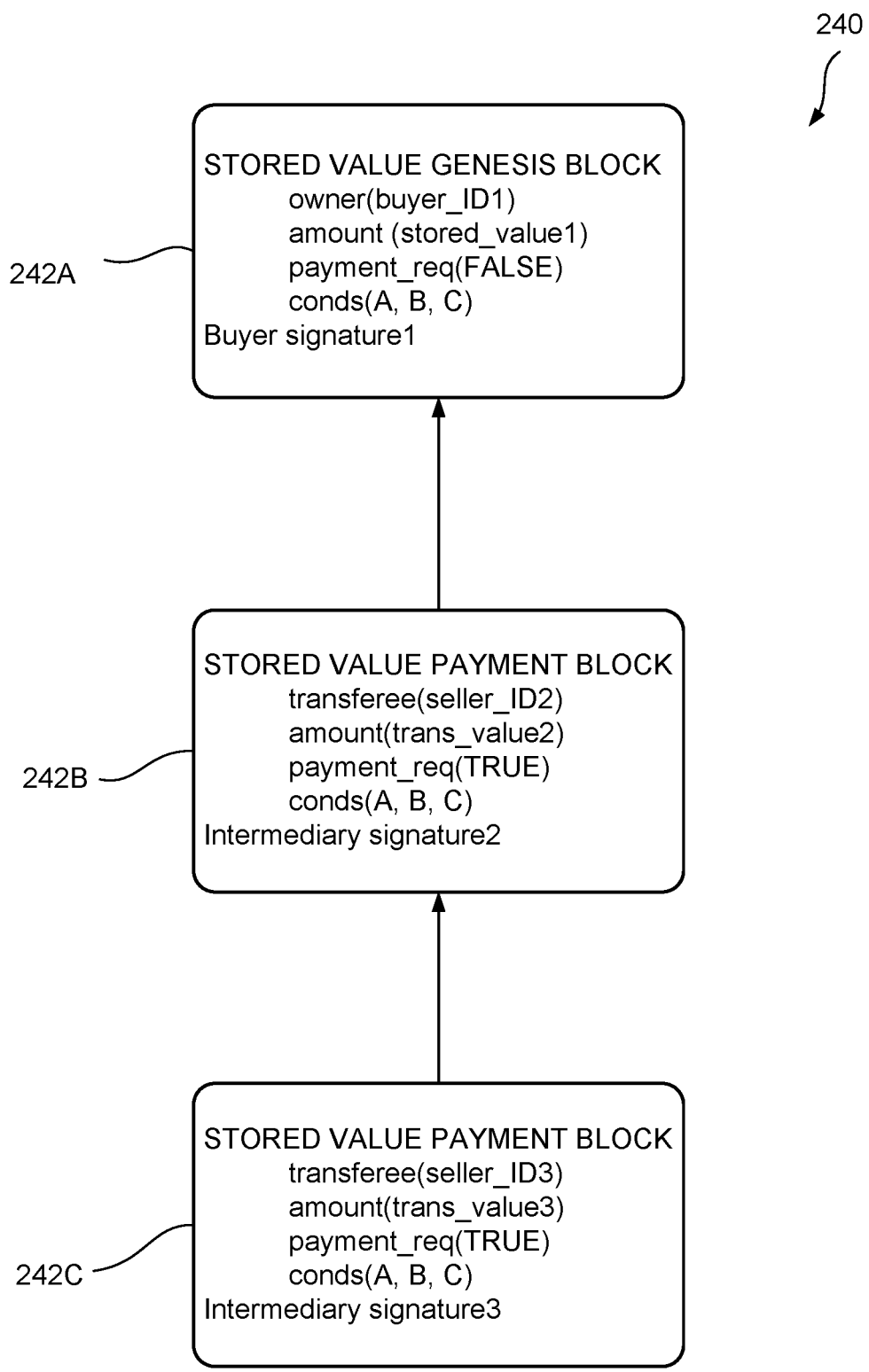
FIG. 2B is a data architecture diagram showing another illustrative example of a stored value blockchain where each block on the blockchain stores and controls transfers from the stored value.

FIG. 2B is a data architecture diagram showing another illustrative example of a stored value blockchain 240, where the stored value blocks 242 track stored value committed to a stored value blockchain 240. Stored value genesis block 242A identifies the owner as buyer_ID1, indicates the amount of stored value stored_value1, payment_req is initially set to FALSE, and, in this example, conditions A, B and C are defined for the contract to transfer a portion of the stored value to a transferee. In this example, stored value genesis block 242A is signed by the buyer buyer_ID1.

When a transfer payment is to be executed, such as responsive to a request to pay from buyer_ID1 or instructions to pay by the intermediary entity, stored value payment block 242B is created that identifies a transferee of the payment and an amount of the payment. In this example, a payment of trans_value2 is to be made to seller_ID2. The amount to be transferred and the transferee can, for example, be defined in the request or instruction or defined in the conditions conds(A, B, C) defined in stored value genesis block 242A.

In this example, a signature from the intermediary entity is required to transfer the funds to seller_ID2, which provides for an intermediary to maintain control over the payments. For example, where the intermediate entity monitors the conditions defined in blocks 242 and initiates payment when the conditions are satisfied, only the signature of the intermediary entity is required. Other variations are possible without departing from the teaching of the disclosed technology.

Figure 3A:
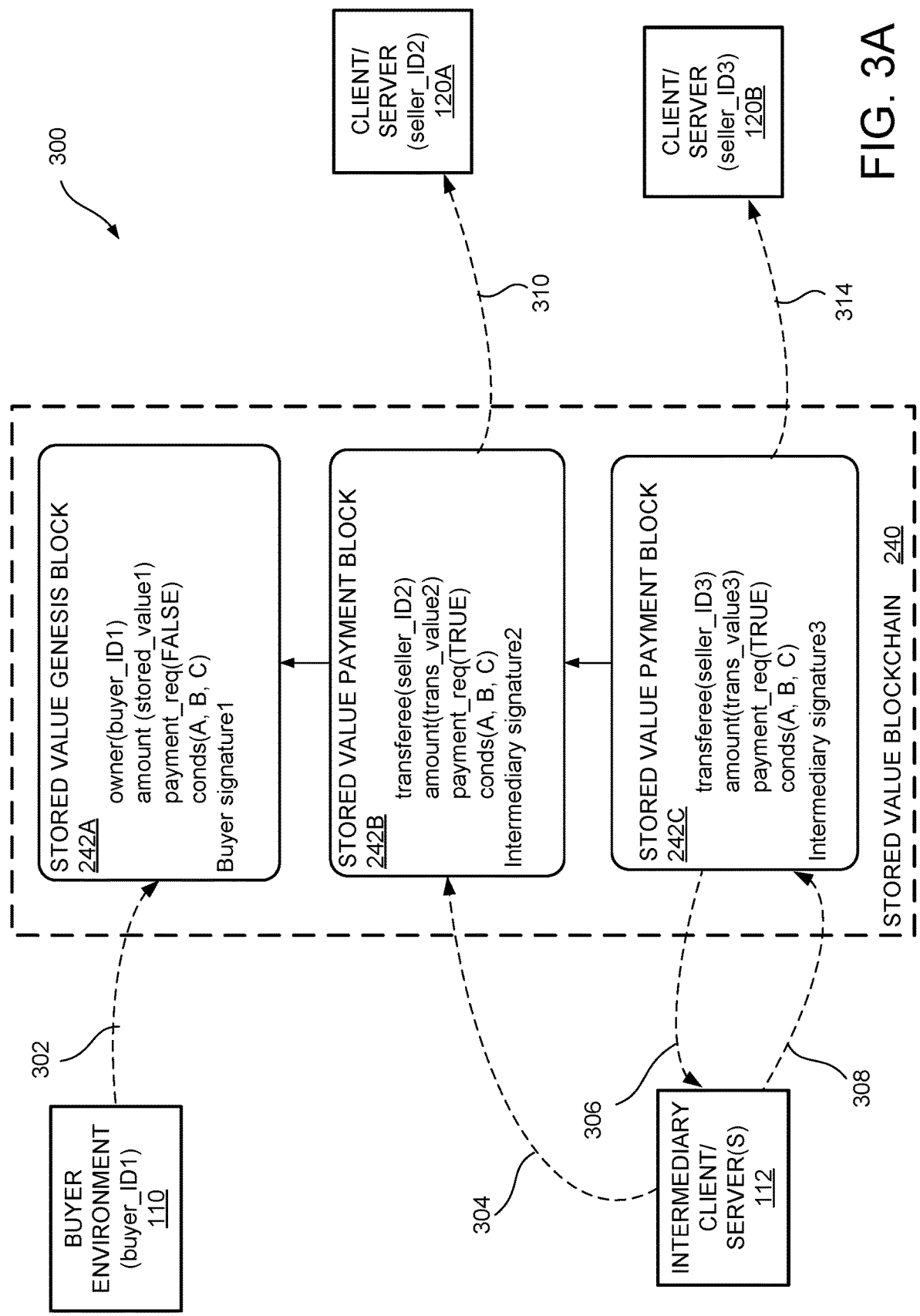
FIG. 3A is a data architecture diagram showing an illustrative example of buyer environment creating a stored value block for storing value and controlling transfers from the stored value according to defined terms.

A stored value blockchain, such as blockchain 140 in FIG. 1 or blockchain 240 in FIG. 2B, enables stored value to be securely stored on a blockchain and transfers from the stored value managed and tracked. FIG. 3A is a data architecture diagram showing two simplified illustrative examples of the use of a stored value blockchain for securely managing stored value.

Stored value genesis block 242A, as illustrated in this example, shows an initial state of the block when initially created by buyer environment 110 at 302. Stored value genesis block 242A identifies the owner as buyer_ID1, indicates the amount stored as stored_value1, initializes the payment required field payment_req to FALSE, and defines a set of conditions conds(A, B, C) that apply to transfers from the stored value.

In one example, at 304, buyer environment 110 creates stored value payment block 242B that identifies a transferee for the payment as seller_ID2, the amount of the transfer as trans_value2, and sets the payment_req flag to TRUE. If the conditions of the payment are satisfied, an intermediary signs the block with Intermediary signature2, at 304, to transfer the trans_value2 amount to seller_ID2 at 310.

In another example, predicated on transfers requiring an intermediary entity to verify at least one condition of the conds(A, B, C) is satisfied in order to complete a transfer. Setting the payment_req flag to TRUE causes intermediary client/server 112 to be prompted, at 306, to verify that one of the conds(A, B, C) has been satisfied. At 308, the intermediate entity verifies the condition has been satisfied and stored value payment block 242C is created that identifies a transferee for the payment as seller_ID3 and the amount of the transfer as trans_value3. The stored value payment block 242C is signed with Intermediary signature3 to transfer amount trans_value3 to seller_ID3 at 314.

For example, the stored value blocks are configured such that buyer_ID1 can identify a transferee and a transfer amount and set payment_req to TRUE. The intermediary entity is prompted to verify conds(A, B, C) at 306 and, if the terms are satisfied, sign the stored value payment block at 308 to transfer the funds.

In another example, intermediary client/server 112 can monitor conds(A, B, C) and make a transfer payment when the terms are satisfied. For example, the terms can identify a seller to receive a defined payment amount on a defined payment schedule, e.g. a subscription or payment plan.

In another variation, the stored value blocks are configured such that a seller entity can request a transfer and the intermediary entity is prompted to verify the conds(A, B, C) are satisfied in order to make the transfer.

It will be appreciated that the disclosed technology provides the flexibility in configuring the stored value blocks to implement a wide variety of scenarios as desired for particular applications without departing from the teachings of the disclosed technology. The disclosed technology enables a stored value to be securely managed on the stored value blockchain 240. The blockchain 240 can be made widely accessible to other entities to confirm the availability of the stored value, view conditions defined for the stored value, and track transfers from the stored value. The blockchain platform supporting the stored value blockchain ensures the integrity of the stored value and its associated ownership, access, as well as the conditions.

Scripts for payment and verification of the conditions can be secured by the stored value blocks 242 of stored value blockchain 240 and executed by the operating system of the decentralized, distributed blockchain platform. FIG. 3B is a data architecture diagram showing an illustrative example of stored value block 242 that includes example of a Payment script to initiate payment and a Complete script for initiating third party verification by the intermediary entity. Also shown is a process 320 in a blockchain environment that creates a stored value block 242. An example of block state 322 defined for the stored value block 242 is also shown.

In this example, the Distribution script is called by a seller entity to obtain payment of a payment amount. If paymentID.required is set to TRUE and the caller of the script is the seller entity, then the transfer is validated and the transferee is set to the seller. The Complete script is called by a buyer to set payment[id].required to true to obtain third party verification and allow a transfer to occur.

Figure 4A:
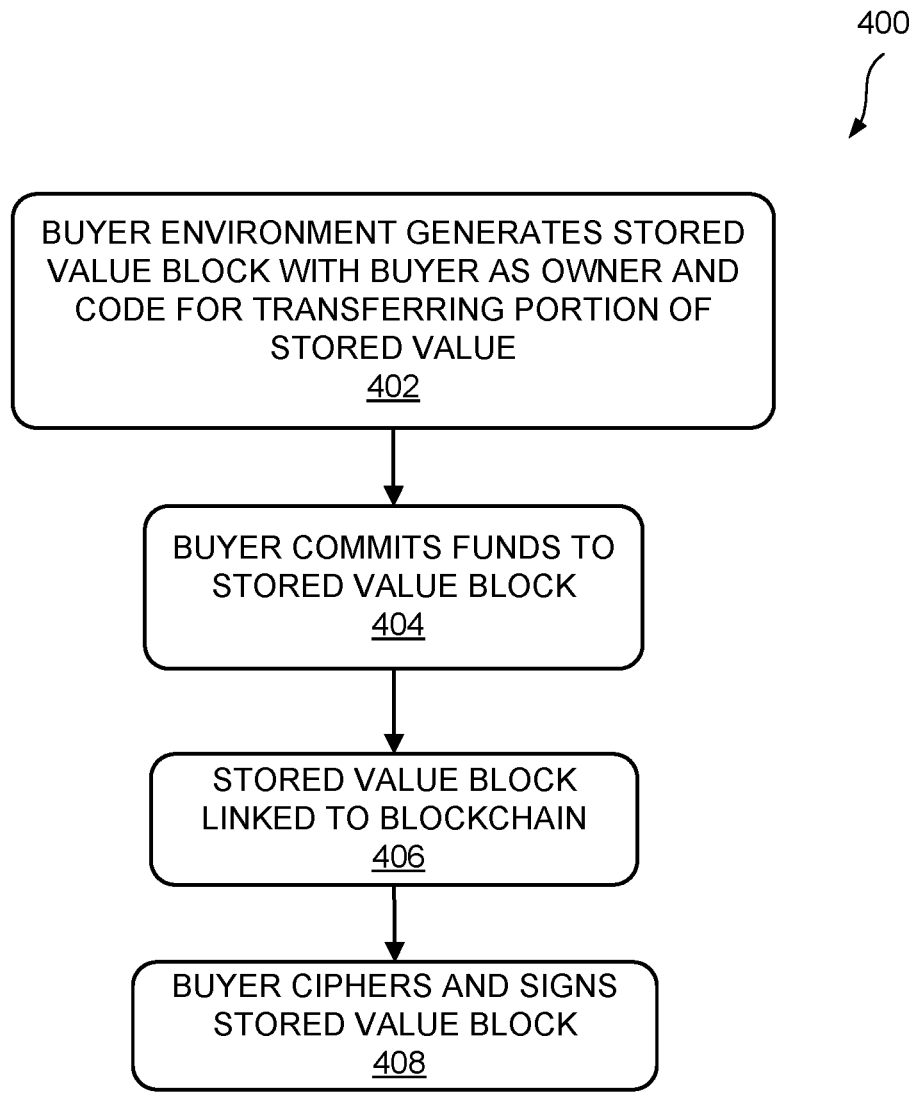
FIG. 4A is a control flow diagram showing an illustrative example of a process for a buyer entity to create a stored value block on a stored value blockchain for storing value.

FIG. 4A is a control flow diagram showing an illustrative example of a process 400 for creating a stored value block for securely managing stored value on a blockchain in accordance with the disclosed technology. This example involves creating a stored value block, at 402, that identifies a buyer entity as owner and includes code for transferring a portion of the stored value. At 404, the buyer commits funds to the stored value block that constitute the stored value. At 406, the stored value block created at 402 is linked to the stored value blockchain and, at 408, the block is ciphered and signed by the buyer entity to commit the block to the stored value blockchain, such as stored value blockchain 140 in FIG. 1 or stored value blockchain 240 of FIG. 2B.

Figure 4B:
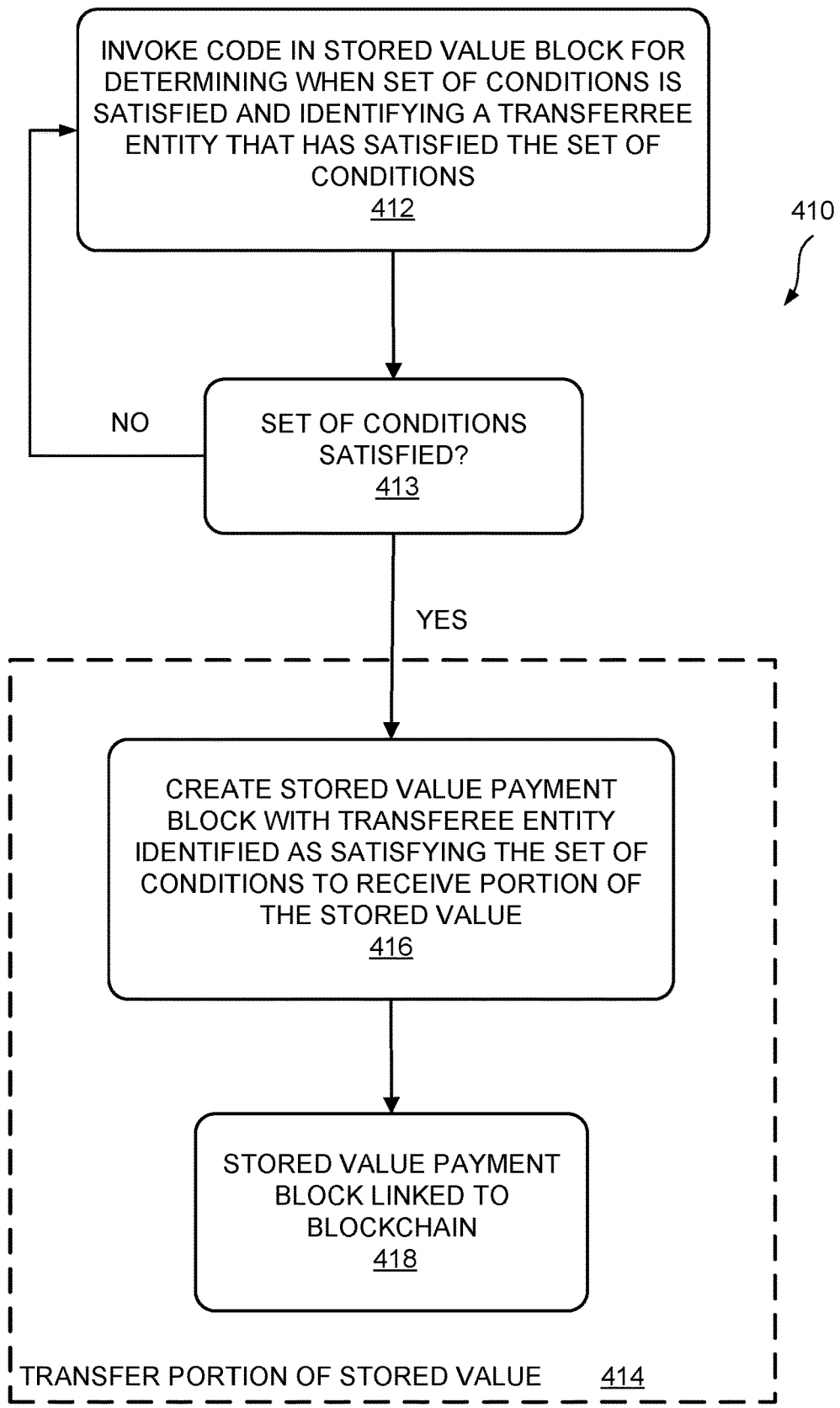
FIG. 4B is a control flow diagram showing an illustrative example of a process for transferring a portion of the stored value to a seller entity using a stored value block on a stored value blockchain.

FIG. 4B is a control flow diagram showing an illustrative example of a process 410 for a buyer entity to initiate transfer of funds to an identified seller entity. At 412, code in the stored value block is invoked to determine whether a set of conditions defined in the stored value block is satisfied for transfer of a portion of the stored value to a transferee party that is identified as having satisfied the set of conditions. At 413, the set of conditions is checked to determine if the defined conditions are met. If the conditions are not met, then control returns to 412. For example, the code can be invoked periodically to check the conditions or the code can be invoked by the buyer entity or a transferee entity to determine whether the conditions are satisfied.

If the defined conditions are met, then, at 414, code is invoked to transfer a portion of the stored value secured by the stored value block to a transferee entity identified as satisfying the defined conditions in steps 412 and 413. In the example illustrated in FIG. 4B, the transfer involves creating, at 416, a stored value payment block with the identified transferee entity as the transferee for a portion of the stored value. At 418, the stored value payment block is linked to the stored value blockchain.

In one example, the buyer entity can define an amount of the portion of stored value to be transferred and identifies the designated party to receive the payment. In another example, an intermediary entity or a blockchain platform supporting the stored value blockchain for the stored value can invoke the code to determine whether the defined conditions are satisfied, the identity of the transferee entity that has satisfied the defined conditions, and, in some examples, the amount of the portion of the stored value to transfer to the transferee entity. The flexibility of the disclosed technology provides for a wide range of other possible variations without departing from the disclosed technology.

Figure 4C:
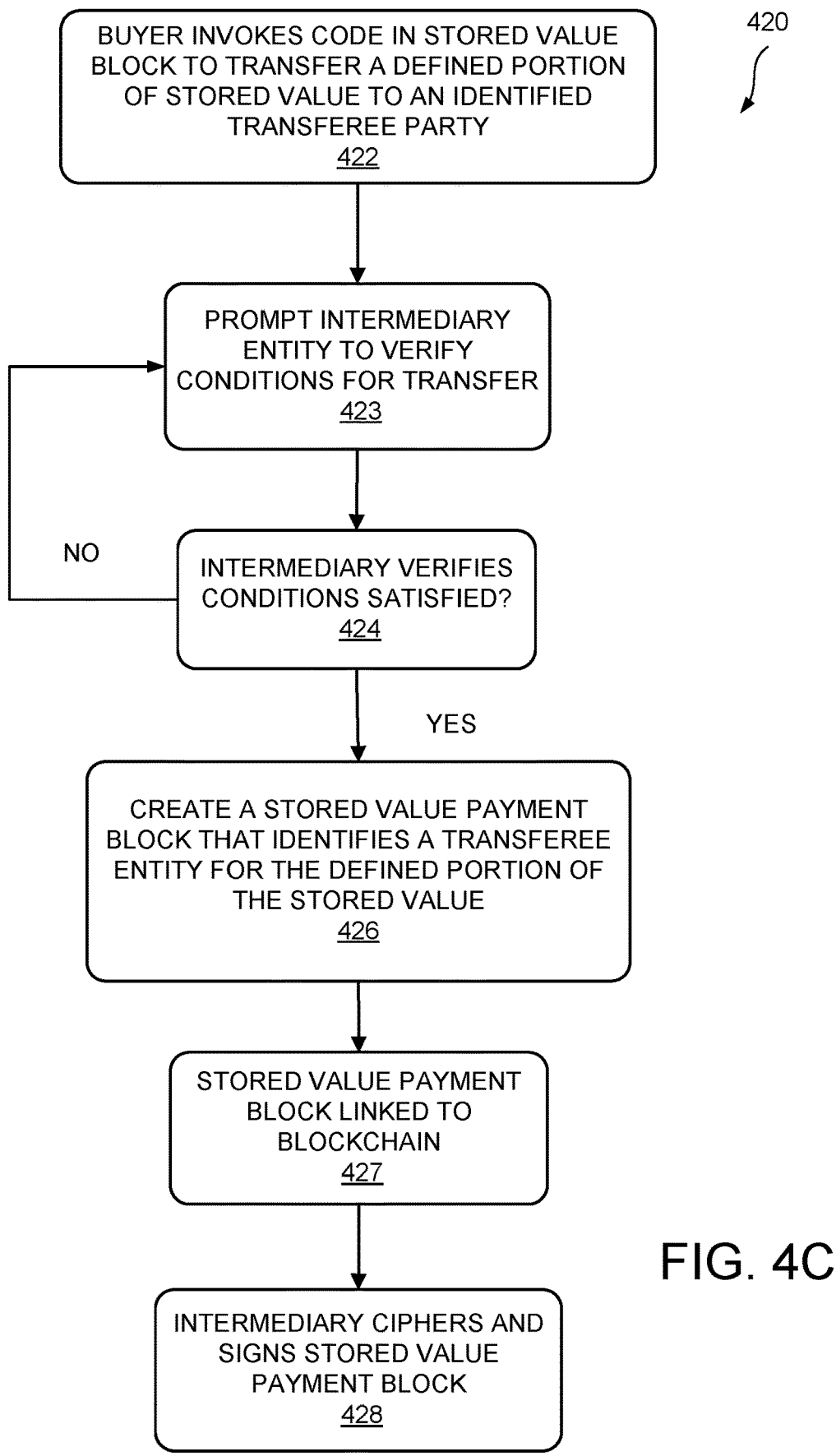
FIG. 4C is a control flow diagram illustrating an example of a process for transferring a portion of the stored value to a seller entity using a stored value block on a stored value blockchain involving an intermediary entity.

FIG. 4C is a control flow diagram showing another illustrative example of a process 420 for a buyer entity to initiate transfer of funds to an identified seller entity that includes verification by an intermediary entity. At 422, the buyer entity invokes code in the stored value block for transfer of a portion of the stored value to a designated party, where the buyer entity defines an amount of the portion of stored value to be transferred and identifies the designated party to receive the payment. At 423, an intermediary entity is prompted to verify whether conditions defined in the stored value block are satisfied. If the intermediary is unable to verify that the defined conditions are satisfied, then control returns, at 424, back to 423 to again prompt the intermediary.

If the intermediary is able to verify that the defined conditions are satisfied, then control branches, at 424, to 426, where a stored value payment block is created with the identified transferee entity as the transferee for the defined portion of the stored value. At 428, the stored value payment block is linked to the stored value blockchain. In some examples, the intermediate entity ciphers and signs the stored value payment block to transfer the defined portion to the transferee entity.

Figure 4D:
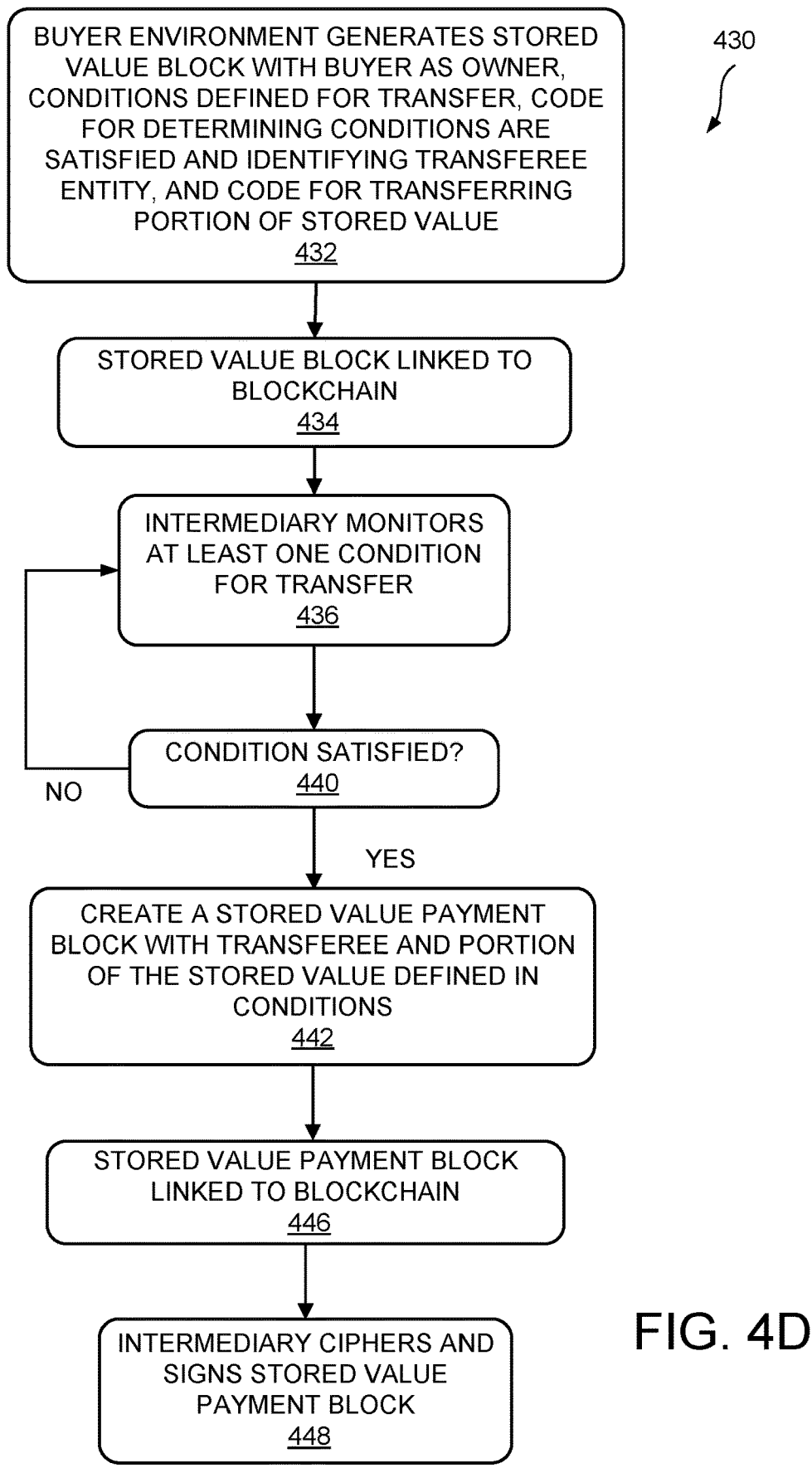
FIG. 4D is a control flow diagram illustrating another example of a process for transferring a portion of the stored value to a seller entity using a stored value block on a stored value blockchain under control of an intermediary entity.

FIG. 4D is a control flow diagram showing another illustrative example of a process 430 for transfer of funds from the stored value to a seller entity. In this example, at 432, a stored value block is created with conditions defined for transfer including an identity of the transferee entity and the amount to be transferred. For example, a particular transferee entity is to be paid a predefined amount on a defined schedule. At 434, the stored value block is linked to the stored value blockchain.

At 436, an intermediary entity monitors one or more of the conditions for transfer to determine whether they have been satisfied, e.g. the intermediary entity detects that a payment date has arrived. If the defined conditions are satisfied, then control branches at 440 to 442, where a stored value payment block is created with the defined transferee entity and defined amount. Alternatively, the amount can be determined by the conditions.

At 446, the stored value payment block is linked to the stored value blockchain. At 448, the intermediate entity ciphers and signs the stored value payment block to transfer the defined portion to the transferee. In this example, transfer of the stored value on the blockchain is determined by the conditions defined in the stored value block and transfer takes place under the control of the intermediary entity.

Figure 4E:
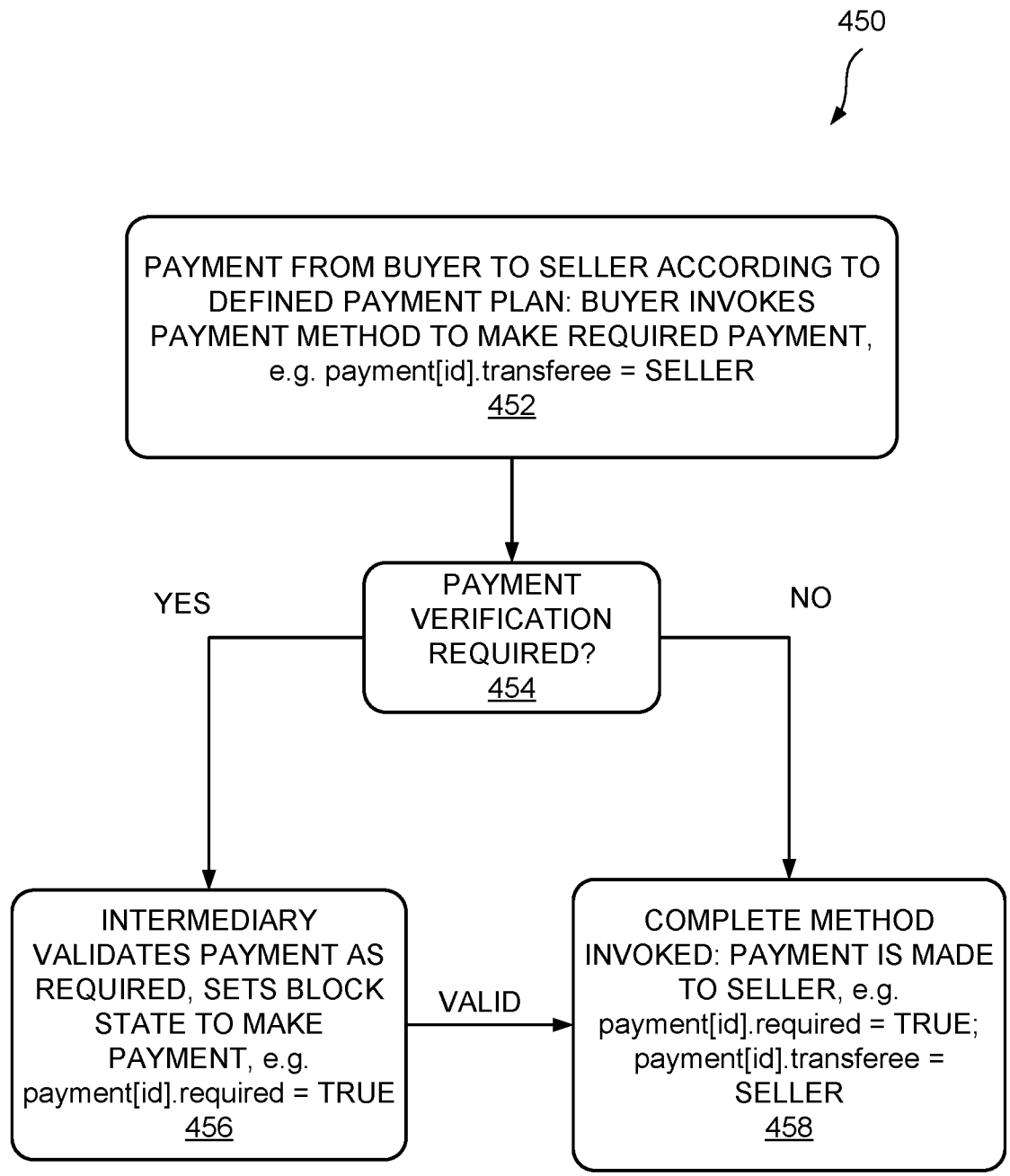
FIG. 4E is a control flow diagram illustrating still another example of a process for transferring a portion of the stored value to a seller entity using a stored value block on a stored value blockchain involving an intermediary entity.

FIG. 4E is a control flow diagram illustrating an example of process for transfers from the stored value on the blockchain based on the example of FIG. 3B. At 452, in order to make payment from a buyer entity to a seller entity according to a payment plan defined in the conditions of the stored value block, the buyer entity invokes the Payment method to make the required payment with the transferee identified as the seller. At 454, if verification of a condition by an intermediate entity is required for payment, control branches to 456. At 456, an intermediary entity validates the payment as required and sets the block state to make payment, e.g. payment[id].required=TRUE. If the payment is validated, then control branches to 458 where the Complete method is invoked to make payment to the seller.

It should be appreciated that the processes shown for examples and a variety of other approaches may be utilized without departing from the disclosed technology.

Depending upon the scripting capabilities of the blockchain platform, the data blocks of the stored value blockchain may include more extensive code execution. For example, a stored value management system that involves an intermediary entity or complex conditions may require more extensive code execution capability in the blockchain than a stored value management system that involves only the buyer entity or simple conditions.

It should be appreciated that the utilization of blockchain technology, such as scripting technology within smart contracts, in this context provides a high degree of flexibility and variation in the configuration of implementations without departing from the teachings of the present disclosure.

Figure 5:
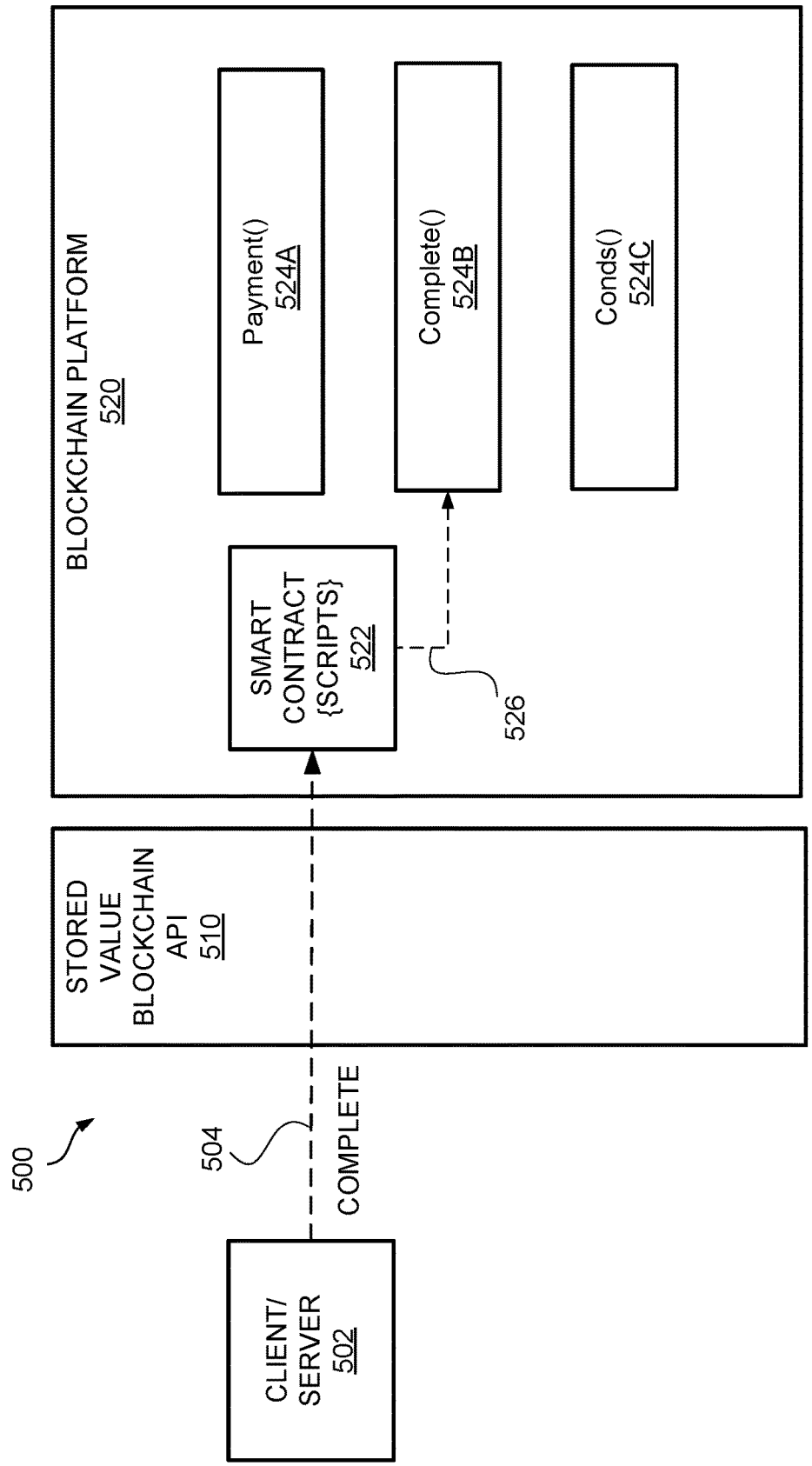
FIG. 5 is a data architecture diagram showing an illustrative example of a user using an application programming interface to manage stored value on a stored value blockchain.

FIG. 5 is a data architecture diagram showing an illustrative example of an interface for accessing a stored value blockchain, such as blockchain 140 in FIG. 1, blockchain 200 in FIG. 2A, blockchain 240 in FIG. 2B, or blockchain 240 in FIG. 3A. In this example, stored value blockchain Application Program Interface (API) 510 provides an interface to the blockchain platform 520 that supports the stored value blockchain. The blockchain platform 520 supports a smart contract 522, such as stored value block 242 in FIG. 3B, which includes scripts 524 with code that, when executed by the blockchain platform 520, perform operations with respect to the stored value blockchain.

In the example of FIG. 5, three scripts are defined in smart contract 522. The Payment script 524A and Complete script 524B are described above with respect to FIGS. 3B and 4E. An additional script Conds( ) is provided to permit a buyer entity or another entity to define the conditions for the stored value block.

In the example of FIG. 5, a buyer entity, e.g. a user of client/server 502, sends Complete request 504 through the stored value blockchain API 510 to smart contract 522 to invoke, at 526, the Complete script 524B. The Complete script performs as described above to complete transfer of funds to a seller.

Blockchain Ledger Data Structure

Figure 6A:
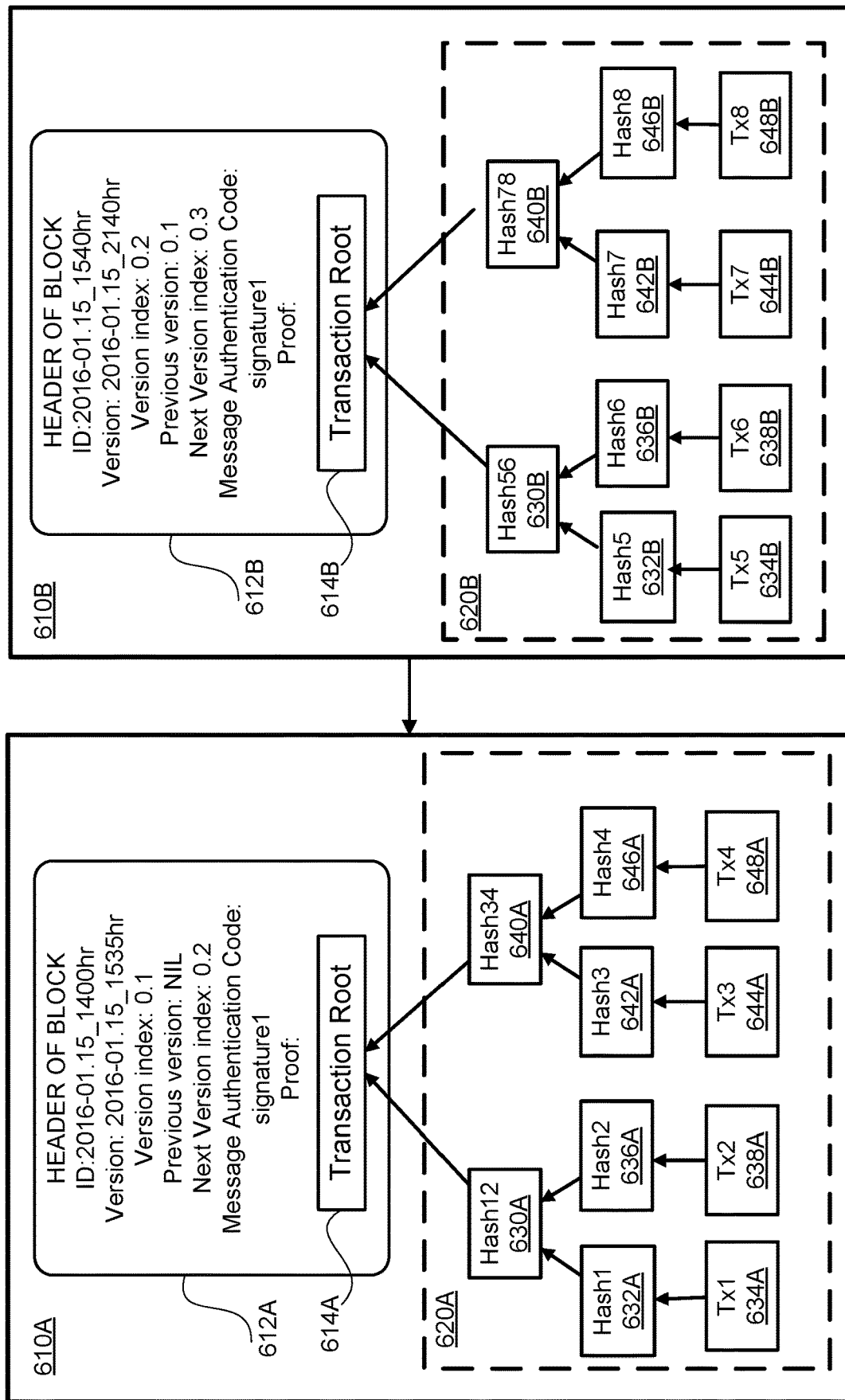
FIG. 6A is a data architecture diagram illustrating a simplified example of a blockchain ledger based on the stored value blocks of the stored value blockchain of FIG. 1.

FIG. 6A is a data architecture diagram illustrating a simplified example of a blockchain ledger 600 based on the blocks 142A-E of the stored value blockchain 140 of FIG. 1. The blockchain ledger 600 example of FIG. 6A is simplified to show block headers, metadata and signatures of blocks 210A-E in order to demonstrate a stored value ledger using a blockchain. In outline, a blockchain ledger may be a globally shared transactional database.

FIG. 6A is an illustrative example of a blockchain ledger 600 with a data tree holding transaction data that is verified using cryptographic techniques. In FIG. 6A, each block 610 includes a block header 612 with information regarding previous and subsequent blocks and stores a transaction root node 614 to a data tree 620 holding transactional data. Transaction data may store smart contracts, data related to transactions, or any other data. The elements of smart contracts may also be stored within transaction nodes of the blocks.

In the example of FIG. 6A, a Merkle tree 620 is used to cryptographically secure the transaction data. For example, Transaction Tx1 node 634A of data tree 620A of block 610A can be hashed to Hash1 node 632A, Transaction Tx2 node 638A may be hashed to Hash2 node 636A. Hash1 node 632A and Hash2 node 636A may be hashed to Hash12 node 630A. A similar subtree may be formed to generate Hash34 node 640A. Hash12 node 630A and Hash34 node 640A may be hashed to Transaction Root 614A hash sorted in the data block 610A. By using a Merkle tree, or any similar data structure, the integrity of the transactions may be checked by verifying the hash is correct.

Figure 6B:
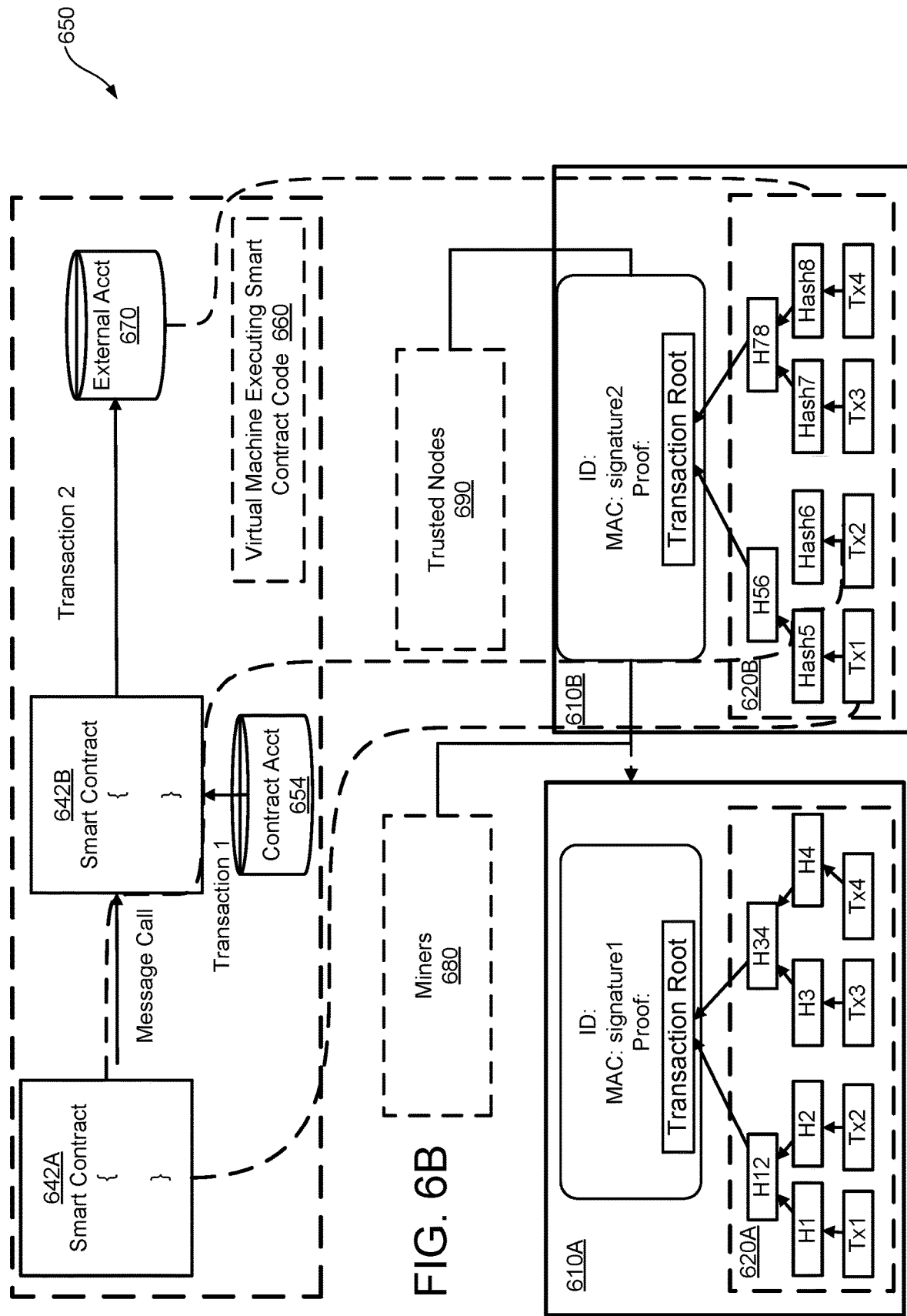
FIG. 6B is a data architecture diagram showing an illustrative example of smart contract code, transactions and messages that are bundled into a block so that their integrity is cryptographically secure and so that they may be appended to a blockchain ledger.

FIG. 6B is a data architecture diagram showing an illustrative example of smart contract code, transactions and messages that are bundled into a block so that their integrity is cryptographically secure and so that they may be appended to a blockchain ledger. In FIG. 6B, smart contracts 642 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 6B, smart contracts 642 are executed in a virtual machine environment, although this is optional.

In FIG. 6B, the aspects of smart contracts 642 are stored in transaction data nodes in data tree 620 in the blocks 610 of the blockchain ledger of FIG. 6A. In the example of FIG. 6B, Smart Contract 642A is stored in data block Tx1 node 634A of data tree 620A in block 610A, Smart Contract 642B is stored in Tx2 node 638A, Contract Account 654 associated with Smart Contract 642B is stored in Tx3 node 644A, and External Account is stored in Tx4 node 648A.

Storage of Smart Contracts and Transaction Data in the Blockchain Ledger

To ensure the smart contracts are secure and generate secure data, the blockchain ledger must be kept up to date. For example, if a smart contract is created, the code associated with a smart contract must be stored in a secure way. Similarly, when smart contract code executes and generates transaction data, the transaction data must be stored in a secure way.

In the example of FIG. 6B, two possible embodiments for maintenance of the blockchain ledger are shown. In one embodiment, untrusted miner nodes ("miners") 680 may be rewarded for solving a cryptographic puzzle and thereby be allowed to append a block to the blockchain. Alternatively, a set of trusted nodes 690 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process for blocks on the ledger is determined by a centralized control of a cluster of trusted nodes. In this case, the centralized control may be a trusted node, such as buyer environment 110, authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a stored value block 142 for stored value blockchain 140, the block is an unconfirmed and unidentified entity. To be part of the acknowledged "currency", it may be added to the blockchain, and therefore relates to the concept of a trusted cluster.

In a trusted cluster, when a stored value block 142 is added, every node competes to acknowledge the next "transaction" (e.g. a new stored value block). In one example, the nodes compete to mine and get the lowest hash value: min{previous_hash, contents_hash, random_nonce_to_be_guessed}->result. Transaction order is protected by the computational race (faith that no one entity can beat the collective resources of the blockchain network). Mutual authentication parameters are broadcast and acknowledged to prevent double entries in the blockchain.

Alternatively, by broadcasting the meta-data for authenticating a secure ledger across a restricted network, e.g. only the signed hash is broadcast, the blockchain may reduce the risks that come with data being held centrally. Decentralized consensus makes blockchains suitable for the recording of secure transactions or events. The meta-data, which may contain information related to the data file, may also be ciphered for restricted access so that the meta-data does not disclose information pertaining to the data file.

Figure 4F:
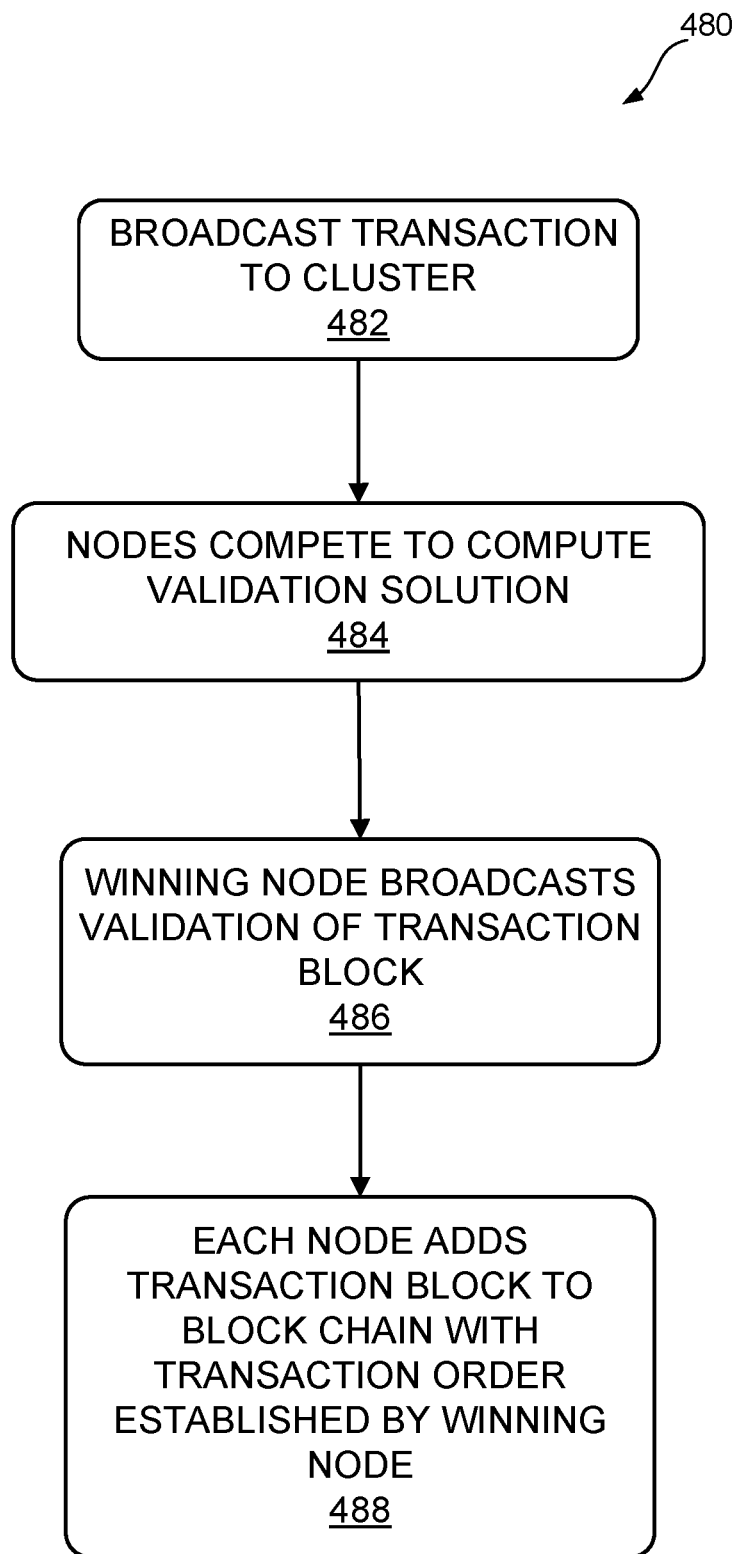
FIG. 4F is a control flow diagram illustrating an example of a validation process for blocks added to the stored value blockchain distributed to untrusted nodes.

The mining process, such as may be used in concert with the validation process 480 of FIG. 4F, may be utilized to deter double accounting, overriding or replaying attacks, with the community arrangement on the agreement based on the "good faith" that no single node can control the entire cluster. A working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions are broadcast, at 482, to the network using software. Mining nodes compete, at 484, to compute a validation solution to validate transactions, and then broadcast, at 486, the completed block validation to other nodes. Each node adds the block, at 488, to its copy of the blockchain with transaction order established by the winning node.

Note that in a restricted network, stake-holders who are authorized to check or mine for the data file may or may not access the transaction blocks themselves, but would need to have keys to the meta-data (since they are members of the restricted network, and are trusted) to get the details. As keys are applied on data with different data classifications, the stake-holders can be segmented.

A decentralized blockchain may also use ad-hoc secure message passing and distributed networking. In this example, the stored value blockchain ledger may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the data file as centrally authorized and kept offline.

In some examples, access to a distributed stored value blockchain may be restricted by cryptographic means to be only open to authorized servers. Since the stored value blockchain ledger is distributed, the authorized servers can validate it. A public key may be used as an address on a public blockchain ledger.

Note that growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programmed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving a stored value blockchain ledger. The specific examples of different aspects of a stored value blockchain ledger described herein are illustrative and are not intended to limit the scope of the techniques shown.

Smart Contracts

Smart contracts are defined by code. As described previously, the conditions of the smart contract may be encoded (e.g., by hash) into a blockchain ledger. Specifically, smart contracts may be compiled into a bytecode (if executed in a virtual machine), and then the bytecode may be stored in a blockchain ledger as described previously. Similarly, transaction data executed and generated by smart contracts may be stored in the blockchain ledger in the ways previously described.

Computer Architectures for Use of Smart Contracts and Blockchain Ledgers

Figure 8:
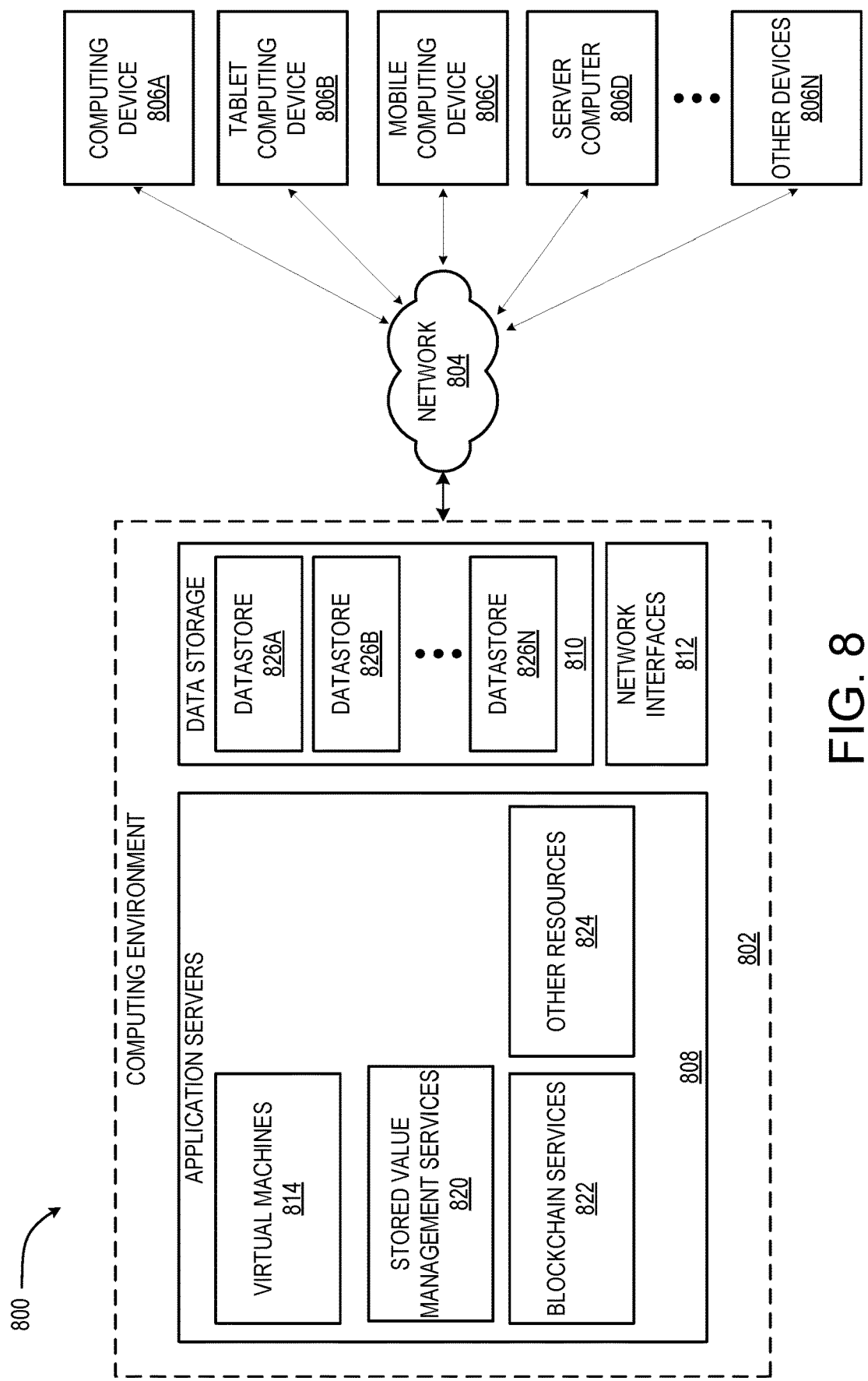
FIG. 8 is a diagram illustrating a distributed computing environment capable of implementing aspects of the techniques and technologies presented herein.

Note that at least parts of processes 400, 410, 420, 430, 450 and 480 of FIGS. 4A, 4B, 4C, 4D, 4E, and 4F, the scripts of stored value block 242 of FIG. 3B, smart contract 522 of FIG. 5, smart contracts 642 of FIG. 6B, and other processes and operations pertaining to a stored value blockchain ledger described herein may be implemented in one or more servers, such as computer environment 800 in FIG. 8, or the cloud, and data defining the results of user control input signals translated or interpreted as discussed herein may be communicated to a user device for display. Alternatively, the stored value blockchain ledger processes may be implemented in a client device. In still other examples, some operations may be implemented in one set of computing resources, such as servers, and other steps may be implemented in other computing resources, such as a client device.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines (e.g. processes 400, 410, 420, 430, 450 and 480 of FIGS. 4A, 4B, 4C, 4D, 4E, and 4F, the scripts of stored value block 242 of FIG. 3B, smart contract 522 of FIG. 5, smart contracts 642 of FIG. 6B) are described herein as being implemented, at least in part, by an application, component, and/or circuit. Although the following illustration refers to the components of FIGS. 1, 3B, 4A, 4B, 4C, 4D, 4E, 4F, 5 and 6B, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programming interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

Although the following illustration refers to the components of the FIGURES discussed above, it can be appreciated that the operations of the routines (e.g. processes 400, 410, 420, 430, 450 and 480 of FIGS. 4A, 4B, 4C, 4D, 4E, and 4F, the scripts of stored value block 242 of FIG. 3B, smart contract 522 of FIG. 5, smart contracts 642 of FIG. 6B) may be also implemented in many other ways. For example, the routines may be implemented, at least in part, by a processor of another remote computer or a local computer or circuit. In addition, one or more of the operations of the routines may alternatively or additionally be implemented, at least in part, by a chipset working alone or in conjunction with other software modules. Any service, circuit or application suitable for providing the techniques disclosed herein can be used in operations described herein.

Figure 7:
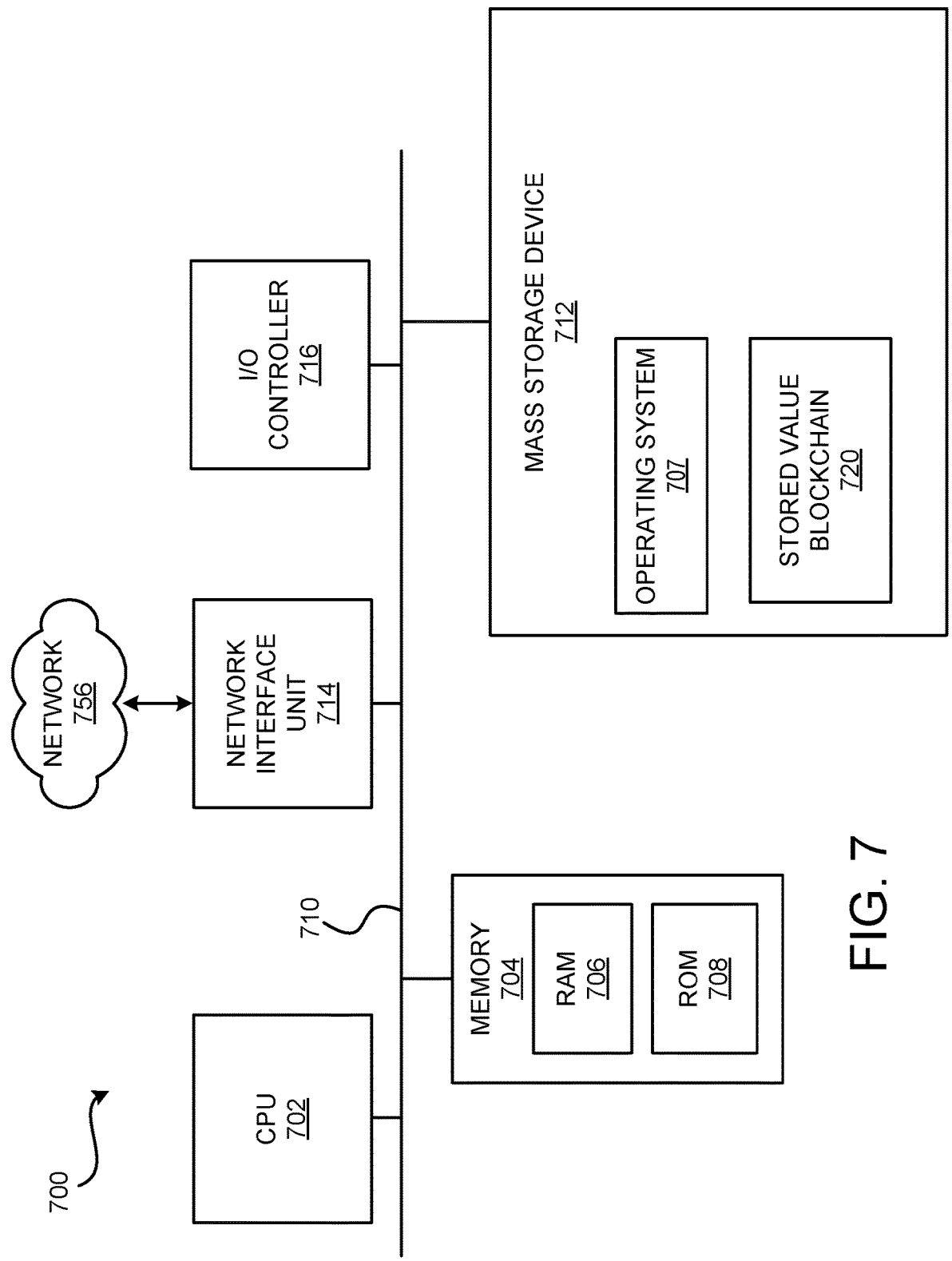
FIG. 7 is a computer architecture diagram illustrating an illustrative computer hardware and software architecture for a computing system capable of implementing aspects of the techniques and technologies presented herein.

FIG. 7 shows additional details of an example computer architecture 700 for a computer, such as the devices 110 and 120A-C (FIG. 1), capable of executing the program components described herein. Thus, the computer architecture 700 illustrated in FIG. 7 illustrates an architecture for a server computer, mobile phone, a PDA, a smart phone, a desktop computer, a netbook computer, a tablet computer, an on-board computer, a game console, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between sub-elements within the computer architecture 700, such as during startup, is stored in the ROM 708. The computer architecture 700 further includes a mass storage device 712 for storing an operating system 707, data (such as a copy of stored value blockchain data 720), and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium," "computer-readable storage medium" and variations thereof, does not include waves, signals, and/or other transitory and/or intangible communication media, per se.

According to various configurations, the computer architecture 700 may operate in a networked environment using logical connections to remote computers through the network 756 and/or another network (not shown). The computer architecture 700 may connect to the network 756 through a network interface unit 714 connected to the bus 710. It should be appreciated that the network interface unit 714 also may be utilized to connect to other types of networks and remote computer systems. The computer architecture 700 also may include an input/output controller 716 for receiving and processing input from a number of other devices, including a keyboard, mouse, game controller, television remote or electronic stylus (not shown in FIG. 7). Similarly, the input/output controller 716 may provide output to a display screen, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

FIG. 8 depicts an illustrative distributed computing environment 800 capable of executing the software components described herein for a stored value blockchain ledger. Thus, the distributed computing environment 800 illustrated in FIG. 8 can be utilized to execute many aspects of the software components presented herein. For example, the distributed computing environment 800 can be utilized to execute one or more aspects of the software components described herein. Also, the distributed computing environment 800 may represent components of the distributed blockchain platform discussed above.

According to various implementations, the distributed computing environment 800 includes a computing environment 802 operating on, in communication with, or as part of the network 804. The network 804 may be or may include the network 556, described above. The network 804 also can include various access networks. One or more client devices 806A-806N (hereinafter referred to collectively and/or generically as "clients 806") can communicate with the computing environment 802 via the network 804 and/or other connections (not illustrated in FIG. 8). In one illustrated configuration, the clients 806 include a computing device 806A, such as a laptop computer, a desktop computer, or other computing device; a slate or tablet computing device ("tablet computing device") 806B; a mobile computing device 806C such as a mobile telephone, a smart phone, an on-board computer, or other mobile computing device; a server computer 806D; and/or other devices 806N, which can include a hardware security module. It should be understood that any number of devices 806 can communicate with the computing environment 802. Two example computing architectures for the devices 806 are illustrated and described herein with reference to FIGS. 7 and 8. It should be understood that the illustrated devices 806 and computing architectures illustrated and described herein are illustrative only and should not be construed as being limited in any way.

In the illustrated configuration, the computing environment 802 includes application servers 808, data storage 810, and one or more network interfaces 812. According to various implementations, the functionality of the application servers 808 can be provided by one or more server computers that are executing as part of, or in communication with, the network 804. The application servers 808 can host various services, virtual machines, portals, and/or other resources. In the illustrated configuration, the application servers 808 host one or more virtual machines 814 for hosting applications or other functionality. According to various implementations, the virtual machines 814 host one or more applications and/or software modules for a data management blockchain ledger. It should be understood that this configuration is illustrative only and should not be construed as being limiting in any way.

According to various implementations, the application servers 808 also include one or more stored value management services 820 and one or more blockchain services 822. The stored value management services 820 can include services for managing stored value on a stored value blockchain, such as stored value blockchain 140 in FIG. 1. The blockchain services 822 can include services for participating in management of one or more blockchains, such as by creating genesis blocks, stored value blocks, and performing validation.

As shown in FIG. 8, the application servers 808 also can host other services, applications, portals, and/or other resources ("other resources") 824. The other resources 824 can include, but are not limited to, data encryption, data sharing, or any other functionality.

As mentioned above, the computing environment 802 can include data storage 810. According to various implementations, the functionality of the data storage 810 is provided by one or more databases or data stores operating on, or in communication with, the network 804. The functionality of the data storage 810 also can be provided by one or more server computers configured to host data for the computing environment 802. The data storage 810 can include, host, or provide one or more real or virtual data stores 826A-826N (hereinafter referred to collectively and/or generically as "datastores 826"). The datastores 826 are configured to host data used or created by the application servers 808 and/or other data. Aspects of the datastores 826 may be associated with services for a stored value blockchain. Although not illustrated in FIG. 8, the datastores 826 also can host or store web page documents, word documents, presentation documents, data structures, algorithms for execution by a recommendation engine, and/or other data utilized by any application program or another module.

The computing environment 802 can communicate with, or be accessed by, the network interfaces 812. The network interfaces 812 can include various types of network hardware and software for supporting communications between two or more computing devices including, but not limited to, the clients 806 and the application servers 808. It should be appreciated that the network interfaces 812 also may be utilized to connect to other types of networks and/or computer systems.

It should be understood that the distributed computing environment 800 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 800 may provide the software functionality described herein as a service to the clients using devices 806. It should be understood that the devices 806 can include real or virtual machines including, but not limited to, server computers, web servers, personal computers, mobile computing devices, smart phones, and/or other devices, which can include user input devices. As such, various configurations of the concepts and technologies disclosed herein enable any device configured to access the distributed computing environment 800 to utilize the functionality described herein for creating and supporting a stored value blockchain ledger, among other aspects.

Figure 9:
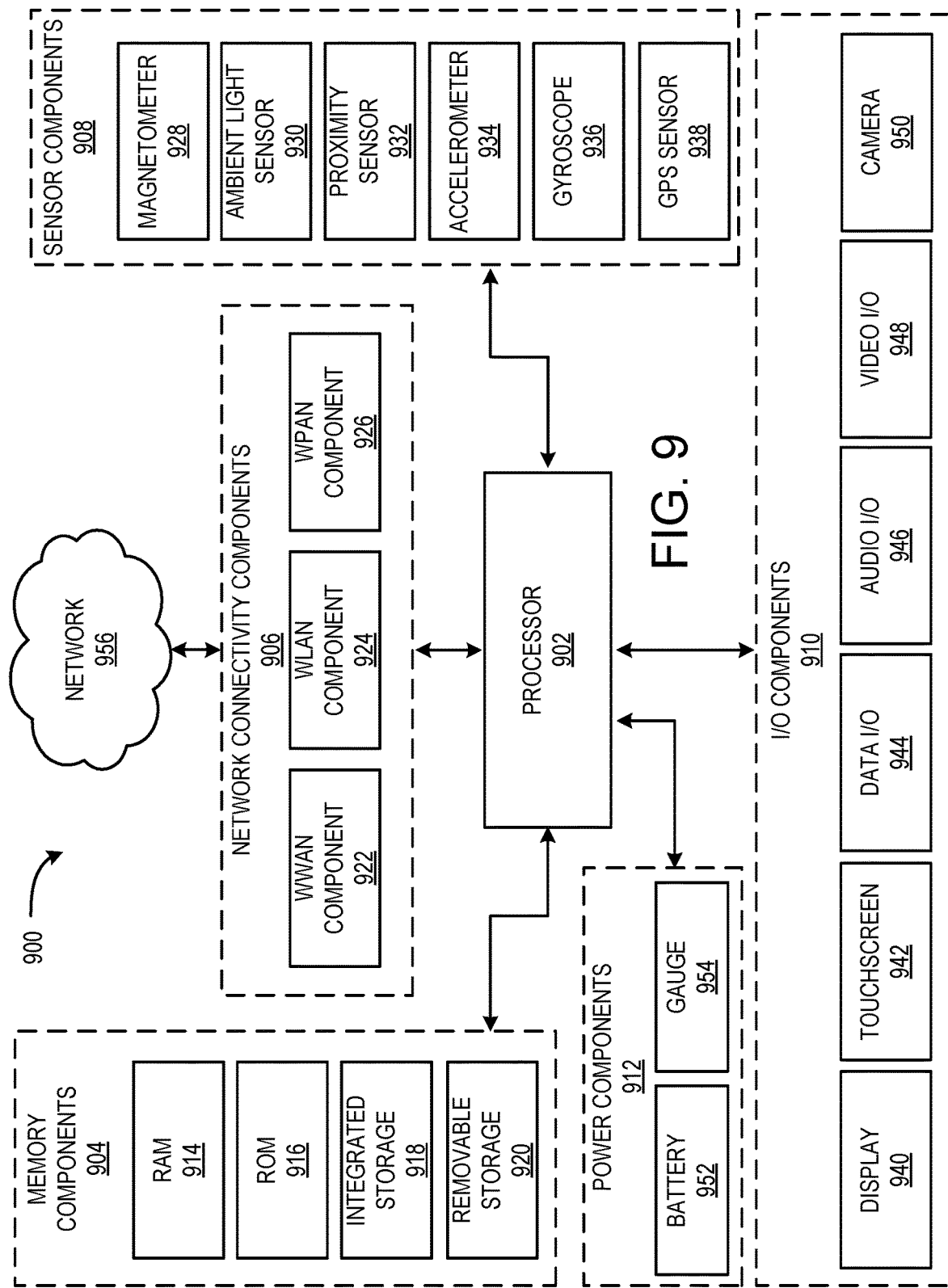
FIG. 9 is a computer architecture diagram illustrating a computing device architecture for a computing device capable of implementing aspects of the techniques and technologies presented herein.

Turning now to FIG. 9, an illustrative computing device architecture 900 for a computing device that is capable of executing various software components is described herein for a stored value blockchain ledger. The computing device architecture 900 is applicable to computing devices that can manage a stored value blockchain ledger. In some configurations, the computing devices include, but are not limited to, mobile telephones, on-board computers, tablet devices, slate devices, portable video game devices, traditional desktop computers, portable computers (e.g., laptops, notebooks, ultra-portables, and netbooks), server computers, game consoles, and other computer systems. The computing device architecture 900 is applicable to the buyer environment 110, verification client/server(s) 112, and client/servers 120A-C shown in FIG. 1 and computing device 806A-N shown in FIG. 8.

The computing device architecture 900 illustrated in FIG. 9 includes a processor 902, memory components 904, network connectivity components 906, sensor components 908, input/output components 910, and power components 912. In the illustrated configuration, the processor 902 is in communication with the memory components 904, the network connectivity components 906, the sensor components 908, the input/output ("I/O") components 910, and the power components 912. Although no connections are shown between the individual components illustrated in FIG. 9, the components can interact to carry out device functions. In some configurations, the components are arranged so as to communicate via one or more busses (not shown).

The processor 902 includes a central processing unit ("CPU") configured to process data, execute computer-executable instructions of one or more application programs, and communicate with other components of the computing device architecture 900 in order to perform various functionality described herein. The processor 902 may be utilized to execute aspects of the software components presented herein and, particularly, those that utilize, at least in part, secure data.

In some configurations, the processor 902 includes a graphics processing unit ("GPU") configured to accelerate operations performed by the CPU, including, but not limited to, operations performed by executing secure computing applications, general-purpose scientific and/or engineering computing applications, as well as graphics-intensive computing applications such as high resolution video (e.g., 620P, 1080P, and higher resolution), video games, three-dimensional ("3D") modeling applications, and the like. In some configurations, the processor 902 is configured to communicate with a discrete GPU (not shown). In any case, the CPU and GPU may be configured in accordance with a co-processing CPU/GPU computing model, wherein a sequential part of an application executes on the CPU and a computationally-intensive part is accelerated by the GPU.

In some configurations, the processor 902 is, or is included in, a system-on-chip ("SoC") along with one or more of the other components described herein below. For example, the SoC may include the processor 902, a GPU, one or more of the network connectivity components 906, and one or more of the sensor components 908. In some configurations, the processor 902 is fabricated, in part, utilizing a package-on-package ("PoP") integrated circuit packaging technique. The processor 902 may be a single core or multi-core processor.

The processor 902 may be created in accordance with an ARM architecture, available for license from ARM HOLDINGS of Cambridge, United Kingdom. Alternatively, the processor 902 may be created in accordance with an x86 architecture, such as is available from INTEL CORPORATION of Mountain View, Calif. and others. In some configurations, the processor 902 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 904 include a random access memory ("RAM") 914, a read-only memory ("ROM") 916, an integrated storage memory ("integrated storage") 918, and a removable storage memory ("removable storage") 920. In some configurations, the RAM 914 or a portion thereof, the ROM 916 or a portion thereof, and/or some combination of the RAM 914 and the ROM 916 is integrated in the processor 902. In some configurations, the ROM 916 is configured to store a firmware, an operating system or a portion thereof (e.g., operating system kernel), and/or a bootloader to load an operating system kernel from the integrated storage 918 and/or the removable storage 920.

The integrated storage 918 can include a solid-state memory, a hard disk, or a combination of solid-state memory and a hard disk. The integrated storage 918 may be soldered or otherwise connected to a logic board upon which the processor 902 and other components described herein also may be connected. As such, the integrated storage 918 is integrated in the computing device. The integrated storage 918 is configured to store an operating system or portions thereof, application programs, data, and other software components described herein.

The removable storage 920 can include a solid-state memory, a hard disk, or a combination of solid-state memory and a hard disk. In some configurations, the removable storage 920 is provided in lieu of the integrated storage 918. In other configurations, the removable storage 920 is provided as additional optional storage. In some configurations, the removable storage 920 is logically combined with the integrated storage 918 such that the total available storage is made available as a total combined storage capacity. In some configurations, the total combined capacity of the integrated storage 918 and the removable storage 920 is shown to a user instead of separate storage capacities for the integrated storage 918 and the removable storage 920.

The removable storage 920 is configured to be inserted into a removable storage memory slot (not shown) or other mechanism by which the removable storage 920 is inserted and secured to facilitate a connection over which the removable storage 920 can communicate with other components of the computing device, such as the processor 902. The removable storage 920 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 904 can store an operating system. According to various configurations, the operating system may include, but is not limited to, server operating systems such as various forms of UNIX certified by The Open Group and LINUX certified by the Free Software Foundation, or aspects of Software-as-a-Service (SaaS) architectures, such as MICROSFT AZURE from Microsoft Corporation of Redmond, Wash. or AWS from Amazon Corporation of Seattle, Wash. The operating system may also include WINDOWS from Microsoft Corporation of Redmond, Wash., MAC OS or IOS from Apple Inc. of Cupertino, Calif., and ANDROID OS from Google Inc. of Mountain View, Calif. Other operating systems are contemplated.

The network connectivity components 906 include a wireless wide area network component ("WWAN component") 922, a wireless local area network component ("WLAN component") 924, and a wireless personal area network component ("WPAN component") 926. The network connectivity components 906 facilitate communications to and from the network 956 or another network, which may be a WWAN, a WLAN, or a WPAN. Although only the network 956 is illustrated, the network connectivity components 906 may facilitate simultaneous communication with multiple networks, including the network 956 of FIG. 9. For example, the network connectivity components 906 may facilitate simultaneous communications with multiple networks via one or more of a WWAN, a WLAN, or a WPAN.

The network 956 may be or may include a WWAN, such as a mobile telecommunications network utilizing one or more mobile telecommunications technologies to provide voice and/or data services to a computing device utilizing the computing device architecture 900 via the WWAN component 922. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 956 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 956 may be configured to provide voice and/or data communications with any combination of the above technologies. The network 956 may be configured to or be adapted to provide voice and/or data communications in accordance with future generation technologies.

In some configurations, the WWAN component 922 is configured to provide dual-multi-mode connectivity to the network 956. For example, the WWAN component 922 may be configured to provide connectivity to the network 956, wherein the network 956 provides service via GSM and UMTS technologies, or via some other combination of technologies. Alternatively, multiple WWAN components 922 may be utilized to perform such functionality, and/or provide additional functionality to support other non-compatible technologies (i.e., incapable of being supported by a single WWAN component). The WWAN component 922 may facilitate similar connectivity to multiple networks (e.g., a UMTS network and an LTE network).

The network 956 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 924 is configured to connect to the network 956 via the WI-FI access points. Such connections may be secured via various encryption technologies including, but not limited to, WI-FI Protected Access ("WPA"), WPA2, Wired Equivalent Privacy ("WEP"), and the like.

The network 956 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 926 is configured to facilitate communications with other devices, such as peripherals, computers, or other computing devices via the WPAN.

The sensor components 908 include a magnetometer 928, an ambient light sensor 930, a proximity sensor 932, an accelerometer 934, a gyroscope 936, and a Global Positioning System sensor ("GPS sensor") 938. It is contemplated that other sensors, such as, but not limited to, temperature sensors or shock detection sensors, also may be incorporated in the computing device architecture 900.

The I/O components 910 include a display 940, a touchscreen 942, a data I/O interface component ("data I/O") 944, an audio I/O interface component ("audio I/O") 946, a video I/O interface component ("video I/O") 948, and a camera 950. In some configurations, the display 940 and the touchscreen 942 are combined. In some configurations two or more of the data I/O component 944, the audio I/O component 946, and the video I/O component 948 are combined. The I/O components 910 may include discrete processors configured to support the various interfaces described below or may include processing functionality built-in to the processor 902.

The illustrated power components 912 include one or more batteries 952, which can be connected to a battery gauge 954. The batteries 952 may be rechargeable or disposable. Rechargeable battery types include, but are not limited to, lithium polymer, lithium ion, nickel cadmium, and nickel metal hydride. Each of the batteries 952 may be made of one or more cells.

The power components 912 may also include a power connector, which may be combined with one or more of the aforementioned I/O components 910. The power components 912 may interface with an external power system or charging equipment via an I/O component.

Examples of Various Implementations

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The present disclosure is made in light of the following examples:

Example 1

A computer-implemented method for managing stored value on a blockchain, where the method includes: creating a stored value contract block on a blockchain, the stored value contract block storing an identifier of a first entity and including: a set of conditions defining when at least a portion of a stored value is to be released, code for determining that the set of conditions is satisfied and identifying a transferee entity that has satisfied the set of conditions, and code for transferring at least a portion of the stored value to the identified transferee entity; and storing funds data to the blockchain, the funds data indicating the stored value that is committed to the stored value contract block by the first entity.

Example 2

The computer-implemented method of Example 1, the method including: invoking the code for determining when the set of conditions is satisfied and identifying a transferee entity that has satisfied the set of conditions; determining that a second entity has satisfied the set of conditions and identifying the second entity as the transferee entity that has satisfied the set of conditions; and transferring the portion of the stored value to the second entity.

Example 3

The computer-implemented method of Example 2, where: the code for determining when the set of conditions is satisfied includes code for prompting an intermediary entity to verify that at least one condition of the set of conditions is satisfied; and the code for transferring the portion of the stored value to the second entity includes code for: responsive to verification from the intermediary entity that the one condition of the set of conditions is satisfied, creating a stored value payment block on the blockchain for transferring the portion of the stored value to the transferee entity identified as having satisfied the set of conditions, and linking the stored value payment block to the stored value block on the blockchain.

Example 4

The computer-implemented method of Example 3, where the stored value payment block on the blockchain requires the signature of the intermediary to release the portion of the stored value.

Example 5

The computer-implemented method of Example 4, where: responsive to the prompting to verify the transfer, the intermediary entity verifies that the one condition of the set of conditions is satisfied; and signs the stored value payment block to release the portion of the stored value.

Example 6

The computer-implemented method of Example 1, where: the method includes creating a stored value payment block on the blockchain for transferring the portion of the stored value that requires a signature of an intermediary entity to release the portion of the stored value; linking the stored value payment block to the stored value block on the blockchain; in the intermediary entity, monitoring at least one condition of the set of conditions to detect that the set of conditions is satisfied and, when the one condition of the set of conditions is satisfied, verifying that the one condition of the set of conditions is satisfied and signing the stored value payment block; and the code for determining when the set of conditions is satisfied includes code for including the verification from the intermediary entity that the one condition of the set of conditions is satisfied in determining that the set of conditions is satisfied.

Example 7

The computer-implemented method of Example 1, where the set of conditions in the stored value contract block comprise conditions for one of an installment payment contract, a subscription contract, an insurance contract, an indemnity contract, a guarantee contract, a deposit contract, a bail bond contract, an incentive contract, and a pre-paid goods or services contract.

Example 8

A system for managing stored value on a blockchain, the system comprising: one or more processors; and one or more memory devices in communication with the one or more processors, the memory devices having computer-readable instructions stored thereupon that, when executed by the processors, cause the processors to execute operations for: creating a stored value contract block on a blockchain, the stored value contract block storing an identifier of a first entity and including: a set of conditions defining when at least a portion of a stored value is to be released, code for determining that the set of conditions is satisfied and identifying a transferee entity that has satisfied the set of conditions, and code for transferring at least a portion of the stored value to the identified transferee entity; and storing funds data to the blockchain, the funds data indicating the stored value that is committed to the stored value contract block by the first entity.

Example 9

The system of Example 8, where the memory devices further include instructions for: invoking the code for determining when the set of conditions is satisfied and identifying a transferee entity that has satisfied the set of conditions; determining that a second entity has satisfied the set of conditions and identifying the second entity as the transferee entity that has satisfied the set of conditions; and transferring the portion of the stored value to the second entity.

Example 10

The system of Example 9, where: the code for determining when the set of conditions is satisfied includes code for prompting an intermediary entity to verify that at least one condition of the set of conditions is satisfied; and the code for transferring the portion of the stored value to the second entity includes code for: responsive to verification from the intermediary entity that the one condition of the set of conditions is satisfied, creating a stored value payment block on the blockchain for transferring the portion of the stored value to the transferee entity identified as having satisfied the set of conditions, and linking the stored value payment block to the stored value block on the blockchain.

Example 11

The system of Example 10, where the stored value payment block on the blockchain requires the signature of the intermediary to release the portion of the stored value.

Example 12

The system of Example 11, where: responsive to the prompting to verify the transfer, the intermediary entity verifies that the one condition of the set of conditions is satisfied; and signs the stored value payment block to release the portion of the stored value.

Example 13

The system of Example 8, where: the one or more storage devices include instructions for creating a stored value payment block on the blockchain for transferring the portion of the stored value that requires a signature of an intermediary entity to release the portion of the stored value; linking the stored value payment block to the stored value block on the blockchain; in the intermediary entity, monitoring at least one condition of the set of conditions to detect that the set of conditions is satisfied and, when the one condition of the set of conditions is satisfied, verifying that the one condition of the set of conditions is satisfied and signing the stored value payment block; and the code for determining when the set of conditions is satisfied includes code for including the verification from the intermediary entity that the one condition of the set of conditions is satisfied in determining that the set of conditions is satisfied.

Example 14

The system of Example 13, where the set of conditions in the stored value contract block comprises at least one of an installment payment contract, a subscription contract, an insurance contract, an indemnity contract, a guarantee contract, a deposit contract, a bail bond contract, an incentive contract, and a pre-paid goods or services contract.

Example 15

One or more computer storage media having computer executable instructions stored thereon which, when executed by one or more processors, cause the processors to execute operations for managing stored value on a blockchain comprising: creating a stored value contract block on a blockchain, the stored value contract block storing an identifier of a first entity and including: a set of conditions defining when at least a portion of a stored value is to be released, code for determining that the set of conditions is satisfied and identifying a transferee entity that has satisfied the set of conditions, and code for transferring at least a portion of the stored value to the identified transferee entity; and storing funds data to the blockchain, the funds data indicating the stored value that is committed to the stored value contract block by the first entity.

Example 16

The computer storage media of Example 15, the media further including instructions for: invoking the code for determining when the set of conditions is satisfied and identifying a transferee entity that has satisfied the set of conditions; determining that a second entity has satisfied the set of conditions and identifying the second entity as the transferee entity that has satisfied the set of conditions; and transferring the portion of the stored value to the second entity.

Example 17

The computer storage media of Example 16, where: the code for determining when the set of conditions is satisfied includes code for prompting an intermediary entity to verify that at least one condition of the set of conditions is satisfied; and the code for transferring the portion of the stored value to the second entity includes code for: responsive to verification from the intermediary entity that the one condition of the set of conditions is satisfied, creating a stored value payment block on the blockchain for transferring the portion of the stored value to the transferee entity identified as having satisfied the set of conditions, and linking the stored value payment block to the stored value block on the blockchain.

Example 18

The computer storage media of Example 17, where the stored value payment block on the blockchain requires the signature of the intermediary entity to release the portion of the stored value.

Example 19

The computer storage media of Example 17, where: responsive to the prompting to verify the transfer, the intermediary entity verifies that the one condition of the set of conditions is satisfied; and signs the stored value payment block to release the portion of the stored value.

Example 20

The computer storage media of Example 17, the media further including instructions for: creating a stored value payment block on the blockchain for transferring the portion of the stored value that requires a signature of an intermediary entity to release the portion of the stored value; linking the stored value payment block to the stored value block on the blockchain; in the intermediary entity, monitoring at least one condition of the set of conditions to detect that the set of conditions is satisfied and, when the one condition of the set of conditions is satisfied, verifying that the one condition of the set of conditions is satisfied and signing the stored value payment block; and the code for determining when the set of conditions is satisfied includes code for including the verification from the intermediary entity that the one condition of the set of conditions is satisfied in determining that the set of conditions is satisfied.

Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method for managing stored value on a blockchain, where the method includes, by one or more computers:
    creating a stored value contract block on a blockchain, the stored value contract block storing an identifier of a first entity and including:
        a set of conditions defining when at least a portion of a stored value is to be released,
        code for determining that the set of conditions is satisfied and identifying a transferee entity that has satisfied the set of conditions, where the code for determining that the set of conditions is satisfied includes code for prompting an intermediary entity to verify that at least one condition of the set of conditions is satisfied, and
        code for transferring the portion of the stored value to the identified transferee entity, where the code for transferring the portion of the stored value to the identified transferee entity includes code for:
            responsive to verification from the intermediary entity that the one condition of the set of conditions is satisfied, creating a stored value payment block on the blockchain for transferring the portion of the stored value to the transferee entity identified as having satisfied the set of conditions, and
            linking the stored value payment block to the stored value block on the blockchain; and
    storing funds data to the blockchain, the funds data indicating the stored value that is committed to the stored value contract block by the first entity.

2. The computer-implemented method of claim 1, the method including:
    invoking the code for determining when the set of conditions is satisfied and identifying a transferee entity that has satisfied the set of conditions to prompt the intermediary entity to verify that the one condition of the set of conditions is satisfied;
    determining that a second entity has satisfied the set of conditions including receiving verification from the intermediary entity that the one condition of the set of conditions is satisfied and identifying the second entity as the transferee entity that has satisfied the set of conditions; and
    transferring the portion of the stored value to the second entity.

3. The computer-implemented method of claim 2, where the stored value payment block on the blockchain requires a signature of the intermediary to release the portion of the stored value.

4. The computer-implemented method of claim 3, where:
    the intermediate entity signs the stored value payment block to release the portion of the stored value.

5. The computer-implemented method of claim 1, where the set of conditions in the stored value contract block comprise conditions for one of an installment payment contract, a subscription contract, an insurance contract, an indemnity contract, a guarantee contract, a deposit contract, a bail bond contract, an incentive contract, and a pre-paid goods or services contract.

6. A system for managing stored value on a blockchain, the system comprising:
    one or more processors; and
    one or more memory devices in communication with the one or more processors, the memory devices having computer-readable instructions stored thereupon that, when executed by the processors, cause the processors to execute operations for:
    creating a stored value contract block on a blockchain, the stored value contract block storing an identifier of a first entity and including:
        a set of conditions defining when at least a portion of a stored value is to be released,
        code for determining that the set of conditions is satisfied and identifying a transferee entity that has satisfied the set of conditions, where the code for determining that the set of conditions is satisfied includes code for prompting an intermediary entity to verify that at least one condition of the set of conditions is satisfied, and
        code for transferring the portion of the stored value to the identified transferee entity, where the code for transferring the portion of the stored value to the identified transferee entity includes code for:
            responsive to verification from the intermediary entity that the one condition of the set of conditions is satisfied, creating a stored value payment block on the blockchain for transferring the portion of the stored value to the transferee entity identified as having satisfied the set of conditions, and
            linking the stored value payment block to the stored value block on the blockchain; and
    storing funds data to the blockchain, the funds data indicating the stored value that is committed to the stored value contract block by the first entity.

7. The system of claim 6, where the memory devices further include instructions for:
    invoking the code for determining when the set of conditions is satisfied and identifying a transferee entity that has satisfied the set of conditions to prompt the intermediary entity to verify that the one condition of the set of conditions is satisfied;
    determining that a second entity has satisfied the set of conditions including receiving verification from the intermediary entity that the one condition of the set of conditions is satisfied and identifying the second entity as the transferee entity that has satisfied the set of conditions; and
    transferring the portion of the stored value to the second entity.

8. The system of claim 7, where the stored value payment block on the blockchain requires a signature of the intermediary to release the portion of the stored value.

9. The system of claim 8, where:
    the intermediate entity signs the stored value payment block to release the portion of the stored value.

10. The system of claim 6 where the set of conditions in the stored value contract block comprises at least one of an installment payment contract, a subscription contract, an insurance contract, an indemnity contract, a guarantee contract, a deposit contract, a bail bond contract, an incentive contract, and a pre-paid goods or services contract.

11. One or more non-transitory computer storage media having computer executable instructions stored thereon which, when executed by one or more processors, cause the processors to execute operations for managing stored value on a blockchain comprising:
   creating a stored value contract block on a blockchain, the stored value contract block storing an identifier of a first entity and including:
   a set of conditions defining when at least a portion of a stored value is to be released,
   code for determining that the set of conditions is satisfied and identifying a transferee entity that has satisfied the set of conditions, where the code for determining that the set of conditions is satisfied includes code for prompting an intermediary entity to verify that at least one condition of the set of conditions is satisfied, and
   code for transferring the portion of the stored value to the identified transferee entity, where the code for transferring the portion of the stored value to the identified transferee entity includes code for:
   responsive to verification from the intermediary entity that the one condition of the set of conditions is satisfied, creating a stored value payment block on the blockchain for transferring the portion of the stored value to the transferee entity identified as having satisfied the set of conditions, and
   linking the stored value payment block to the stored value block on the blockchain; and
   storing funds data to the blockchain, the funds data indicating the stored value that is committed to the stored value contract block by the first entity.

12. The computer storage media of claim 11, the media further including instructions for:
   invoking the code for determining when the set of conditions is satisfied and identifying a transferee entity that has satisfied the set of conditions to prompt the intermediary entity to verify that the one condition of the set of conditions is satisfied;
   determining that a second entity has satisfied the set of conditions including receiving verification from the intermediary entity that the one condition of the set of conditions is satisfied and identifying the second entity as the transferee entity that has satisfied the set of conditions; and
   transferring the portion of the stored value to the second entity.

13. The computer storage media of claim 12, where the stored value payment block on the blockchain requires a signature of the intermediary entity to release the portion of the stored value.

14. The computer storage media of claim 13, where:
   the intermediate entity signs the stored value payment block to release the portion of the stored value.

15. The computer storage media of claim 11, where the set of conditions in the stored value contract block comprises at least one of an installment payment contract, a subscription contract, an insurance contract, an indemnity contract, a guarantee contract, a deposit contract, a bail bond contract, an incentive contract, and a pre-paid goods or services contract.

* * * * *